(12) United States Patent
Joseph

(10) Patent No.: US 10,566,861 B2
(45) Date of Patent: Feb. 18, 2020

(54) MAGNETIC ELECTRIC IMPULSE MOTOR

(71) Applicant: David Joseph, Calgary (CA)

(72) Inventor: David Joseph, Calgary (CA)

(73) Assignee: GLIP Generation Corporation, Saskatoon, Saskatchewan (CA)

(*) Notice: Subject to any disclaimer, the term of this patent is extended or adjusted under 35 U.S.C. 154(b) by 153 days.

(21) Appl. No.: 15/832,773

(22) Filed: Dec. 6, 2017

(65) Prior Publication Data

US 2019/0173340 A1 Jun. 6, 2019

(51) Int. Cl.
| | | |
|---|---|---|
| H02K 21/14 | (2006.01) | |
| H02K 53/00 | (2006.01) | |
| H02K 1/27 | (2006.01) | |
| H02K 11/33 | (2016.01) | |
| H02K 21/24 | (2006.01) | |

(52) U.S. Cl.
CPC ......... *H02K 1/2733* (2013.01); *H02K 1/2753* (2013.01); *H02K 1/2793* (2013.01); *H02K 21/14* (2013.01); *H02K 53/00* (2013.01); *H02K 11/33* (2016.01); *H02K 21/24* (2013.01)

(58) Field of Classification Search
CPC ...... H02K 1/2733; H02K 53/00; H02K 21/14; H02K 1/2793; H02K 1/2753
See application file for complete search history.

(56) References Cited

U.S. PATENT DOCUMENTS

| | | | | |
|---|---|---|---|---|
| 3,888,225 | A * | 6/1975 | Boyer | F02P 7/026 123/617 |
| 6,392,370 | B1 * | 5/2002 | Bedini | H02K 21/24 310/113 |
| 7,638,915 | B2 * | 12/2009 | Sentmanat | H02K 7/14 310/156.11 |
| 8,053,940 | B2 * | 11/2011 | McCulley | H02K 53/00 310/113 |
| 8,963,380 | B2 * | 2/2015 | Fullerton | H02K 21/24 310/12.12 |
| 9,331,534 | B2 * | 5/2016 | Yost | H02K 1/2793 |
| 9,401,631 | B2 * | 7/2016 | Wu | H02K 1/2766 |
| 9,543,802 | B2 * | 1/2017 | Nakano | H02K 5/24 |
| 10,008,910 | B2 * | 6/2018 | Jahshan | H02P 9/02 |
| 10,084,365 | B1 * | 9/2018 | Pandya | H02K 3/28 |
| 2008/0122303 | A1 * | 5/2008 | Santo | H02K 5/148 310/51 |

* cited by examiner

*Primary Examiner* — Michael C Zarroli

(57) ABSTRACT

The invention as claimed, has utility in that it uses separate magnetic field impulses from energized coils and permanent magnets strategically placed together, to maintain an interminable magnetic field upon magnets of a rotor when current is flowing to the coil and when current is not flowing to the coil.

2 Claims, 25 Drawing Sheets

MAGNETIC ELECTRIC IMPULSE MOTOR

TECHNICAL FIELD

The present invention relates to a new type of electric motor.

BACKGROUND

Pulse motors work by recurrent energy pulses applied to an electromagnet coil where the magnetic field while energized, repulses the like facing poles of permanent rare earth magnets on a rotor causing the shaft to spin. When in the non-energized stage, the pulse motor relies on the inertia or momentum of the rotor and or flywheel to maintain the shafts rotation. Further, pulse motors have rotor magnets which are evenly separated by a considerable space between them, with all magnets having like poles facing one direction. This can be radially on the ends of a spoke wheel or horizontally on the flat surface of a rotor.

Some pulse motors use what's called a reengaging method, whereby a permanent magnet is positioned at the back end of the electromagnet to help overcome the remnant magnetic field still acting on the incoming rotor magnet when the coil is first shut off. The rare earth magnets magnetic field collapses when the electric magnet is energized. In general the electromagnets of a pulse motor when energized all have the same polarity acting on the rotor magnets. As aforementioned the rotor magnets are all oriented in the same direction and have the same polarity radially or horizontally depending on the configuration, as the energized electromagnet. This causes the repulsion on all the rotor magnets when all the coils are energized at the same time.

Some pulse motors which claim to also be generators as well, use various configurations of electric magnets and in some cases reengagement magnets and pick up coils to induce an electrical charge in those said pick up coils. The electrical charge from the pick-up coils is then fed back into the pulse motor to create a so called 'very efficient' pulse motor.

The present invention is significantly different to that of a pulse motor or electric motor. The embodiments of this invention do not rely on electricity 100% of the time as do electric motors or in the case of a pulse motor, on inertia or momentum of the rotor and or flywheel during the non-energized phase of the pulse motor coil(s). The present invention acts within the current know laws of physics. The present invention has an unique impulse unit which in the preferred embodiment acts as a stator, comprising a magnetic field conduit, a coil with an iron core or other permeable material and positioned near the said coil is a permanent magnet. The magnetic field conduit in the preferred embodiment encloses the said coil and permanent magnet and has a gap at one end for a magnetic field to cross. This gap takes on the magnetic field polarity of the impulse coil when the said coil is energized; whereby the impulse units permanent magnetics magnetic field is absorbed into the coils magnetic field due to the opposite magnetic field being created by the impulse units energized coil. When the impulse coil is not energized the impulse units permanent magnet magnetic field polarity takes precedence in the magnetic field conduit gap; being opposite to the impulse coils polarity when the impulse coil is energized, and therefore reverses the polarity of the magnetic field in the magnetic field conduit gap. The said magnetic field conduit gap magnetic field polarity can be controlled and synchronised to the alignment of the rotor magnets polarity, rotating through the magnetic field conduit gap by way of the switch.

While pulse motors may have a plurality of permanent magnets attached to a rotor, the rotor magnets have in general either the north pole all facing out from the rotor centre or all south poles facing out from the rotor centre. These same said rotor magnets have a considerable space between them and are generally equally spaced.

The unique embodiments of the present invention use a plurality of permanent magnets on the plane of the rotor surface in the preferred embodiment or horizontal on the rim of a rotor in an alternate arrangement; whereby in either arrangement they are tightly affixed to one another, with each rotor magnet having 'opposite' north and south poles to its adjacent rotor magnets on the same plane.

The coils of a classic pulse motor are wired so that the current from the power source flows in the same direction around each coil; whereby when the coils are energized all at the same time, it results in all the coils magnetic fields having the same polarity orientation as their adjacent coils. As stated above, the rotor magnets all having the same polarity facing the said coil(s) is repulsed out of the coils magnetic field.

The unique embodiments of the present invention have the impulse unit coil wired opposite to their adjacent impulse unit coil: whereby the DC current from the power source through the switch flows around the impulse unit coil in the opposite direction to their adjacent impulse unit coil. This results in the magnetic fields created by the impulse unit coil is to be opposite to the adjacent impulse unit coil. The individual rotor magnets which aforementioned, all having opposite polarity to their adjacent rotor magnets are synchronized through the switch; whereby they are positioned in the impulse unit magnetic field conduit gap whose magnetic field polarity is the same. This results in the rotor magnets being repulsed out of the magnetic field of their current impulse unit magnetic field conduit gap and attracted to the magnetic field in the adjacent impulse unit magnetic field conduit gap.

In the next phase of a classic pulse motor, the coil is turned off and the rotor must spin via way of inertia until it aligns again with the next coil. In this case, the remnant magnetic fields of the coils iron core and friction of the bearings etc. resist the rotor magnets rotation during the coils none energized phase; therefore, a greater pulse of current is required to over come the inherent above-mentioned resistance. If pick-up coils are added to the arrangement to generate electricity, the said pick up coils further cause drag on the rotor due to Lens law.

The present invention over comes both the remnant magnetic fields and the friction issues by its unique embodiments. As in pulse motors, the stator coils are turned off during the non-energized phase. However, the unique embodiments of the present invention use the inherent properties of permanent magnets coupled with the magnetic field conduit to propel the rotor when the stator coils are not energized. To do this, the magnetic polarity of he stator permanent magnets are oriented with opposite polarity its adjacent stator permanent magnets. Because the coils are not energized as aforementioned, the stator permanent magnets magnetic field take precedence in the magnetic field conduit gap. The rotor magnets as already explained, are orientated so as having alternate facing polls to their adjacent rotor magnets. The rotor magnets, having the same magnetic field polarity as the current magnetic field in the magnetic field conduit gap, while also having an opposite magnetic field polarity to the magnetic field of the adjacent magnetic field conduit gap; is repulsed from its current magnetic field conduit gap and attracted at the same time to the adjacent magnetic field conduit gap. This results in the same reaction as during the energized phase, propelling the rotor magnets, turning rotor and shaft; only with the permanent magnets of the stator providing the repulsion and attraction of the said rotor magnets, instead of the energized coils of the stator.

These unique embodiments eliminate the issue of remnant magnet fields in the core of the adjacent stator coils. Friction and drag is over come by having no glide phase but instead are repulsed and attracted in both phases and coupled with the extra power of attraction to the adjacent magnetic field conduit gap magnetic field; which embodiments a pulse motor does not have.

Where less classical pulse motors, use continuous current to drive the rotor, the rotor is made up of rotor magnets which are oriented with opposite poles to their adjacent rotor magnets. The switch sends current to the coils when the like poles of the rotor magnet are facing the electromagnet and reverses the current through the coils as the rotor magnet poles line up again. This achieves a constant magnetic field force on the rotor magnets without a glide phase. However, this requires the current to be flowing at all times, and does not conserve energy any energy. The present invention requires energy only 50% of the time, while achieving a constant magnetic field force on the rotor magnets without a glide phase. This energy saving improvements over standard electric motors and pulse motors, makes the present invention an ideal solution for electric cars, extending their battery range; wherein many other machines and devices where reducing power consumption and thereby cost is deemed advantageous.

SUMMARY OF INVENTION

The purpose of the embodiments of this invention is to provide useful mechanical power while conserving a considerable amount of electricity and thereby cost. In general, the present invention uses timing and unique strategic positioning and magnetic field orientation of impulse unit magnets, energized pulse unit coils and rotor magnets or a shaft magnet to apply maximum magnetic repulsion and attraction forces on said rotor/shaft magnets 100% of the time while using electricity only 50% of the time. The unique embodiments accomplish this by repulsion and attraction during both an energized phase and uniquely during a none energized phase. The consequential effect of the embodiments of this highly efficient invention, allows similar attributes as a standard electric motor while using less energy; and whereby eliminates the hindrances pulse motors incur.

The present invention makes use of electric DC current supplied to and controlled by a switch to provide DC current pulses to a unique impulse coil with an iron or other permeable material core, creating a magnetic field in the said core. In the preferred embodiment of the present invention, the impulse unit permanent magnet, is placed alongside the impulse unit coil; whereby both are coupled with a magnetic field conduit. The magnetic field conduit has a gap in at least one end of the preferred embodiments, whereby the polarity of the magnetic field of the impulse unit permanent magnet takes precedence in the magnetic field conduit gap when the impulse unit coil alongside it is not energized; and whereby the impulse unit permanent magnets magnetic field is attracted into the impulse unit coils magnetic field when the impulse unit coil is energized. This is due to the impulse unit coil polarity and the impulse unit permanent magnet polarity being opposite at the impulse unit coil and impulse unit permanent magnet adjacent poles; resulting in the impulse unit permanent magnets magnetic field taking precedence in the magnetic field conduit gap, which is opposite polarity to the previous energized impulse unit coil phase.

The embodiments of the present invention include a switch which sends a pulse of DC current to the impulse unit coil in one phase and to an open circuit or load(s) in another phase. The switch timing is critical to the embodiments of this invention. The switch in the preferred embodiment sends a pulse of DC current in one phase to a plurality of impulse unit coils when all the magnets of the rotor are aligned in all the impulse unit magnetic field conduit gaps.

In the next phase the switch shuts off current to all the impulse unit coils when the rotor magnets are again aligned in the next impulse unit magnetic field conduit gap; whereby the impulse unit permanent magnet magnetic field polarity take precedence in the impulse unit magnetic field conduit gap as stated previous; and once again having the same polarity of the rotor magnets in the impulse unit magnetic field conduit gap, causes it to be repulsed from the said gap and attracted to the adjacent impulse unit magnetic field conduit gap.

The preferred embodiments of the present invention include a rotor with flat wedge magnets, axially magnetized, affixed horizontally to a rotor. These rotor magnets are positioned tightly together, so oriented having opposite polarity to their adjacent rotor magnets. As explained above, this alternating polarity orientation feature of the rotor magnets, when synchronized with the switch controlling the timing of the current to the impulse unit coils, flips the magnetic field polarity in the impulse unit magnetic field conduit gap. This results in repulsion of the rotor magnates in the impulse unit magnetic field conduit gap and attraction to its adjacent impulse unit magnetic field conduit gap. When the switch turns off the current to the impulse unit coil, the same action occurs; whereby the impulse unit permanent magnet taking precedence in the impulse unit magnetic field conduit gap causing repulsion from the said impulse unit magnetic field conduit gap and attraction to the adjacent impulse unit magnetic field conduit gap, although no current if flowing.

Although no current is required to power one phase of the rotation, the present invention does not act in contrary to the known laws of physics. As explained above, in the none energized phase, repulsion and attraction is powered by the natural properties of permanent magnets resulting in electric energy being conserved in this phase.

BRIEF DESCRIPTION OF DRAWINGS

FIG. 21 is alternating DC current between the impulse unit coils and electric storage device; which converts the pulse DC current to AC or DC and sends the steady current to a load.

FIG. 21 is alternating DC current between the impulse unit coils and a load directly.

FIG. 21 is alternating DC current between impulse unit coils of this present invention designated UNIT 1 and another of this same invention designated UNIT 2.

DESCRIPTION OF EMBODIMENTS

Figure 1:
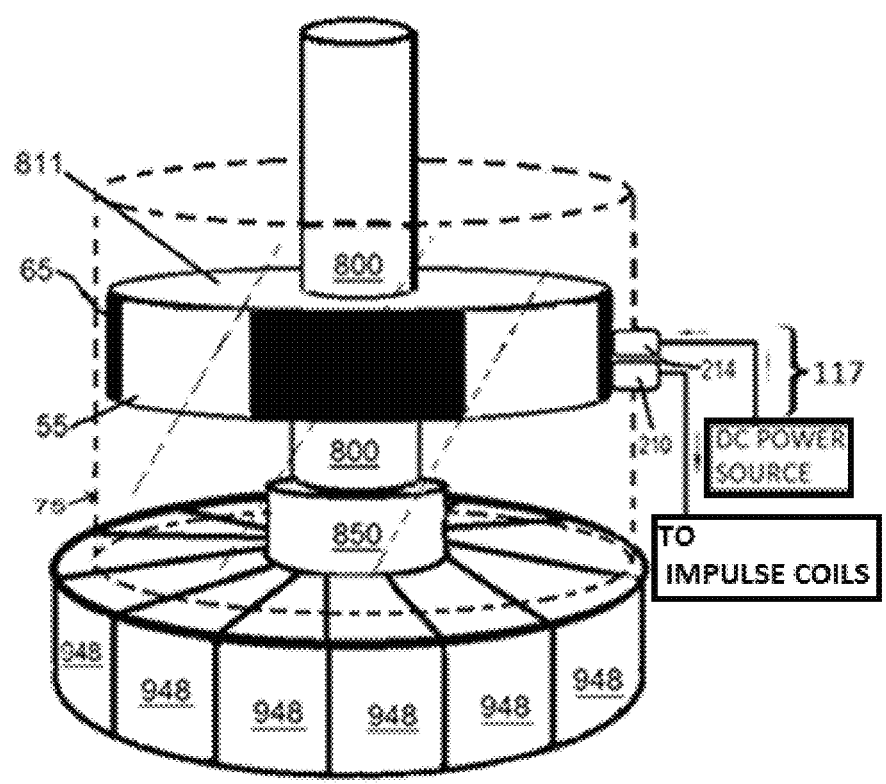
FIG. 1 illustrates the preferred configuration of this present invention showing a side angle view of a plurality of impulse units making up the base. Also shown is the shaft, rotor and flywheel which is combined with the copper contacts and non-conducting material contacts, to act as a commuter and a set of two brushes supported by a transparent plastic tube within the present invention; whereby the present invention is supplied by a DC power source.
Figure 2:
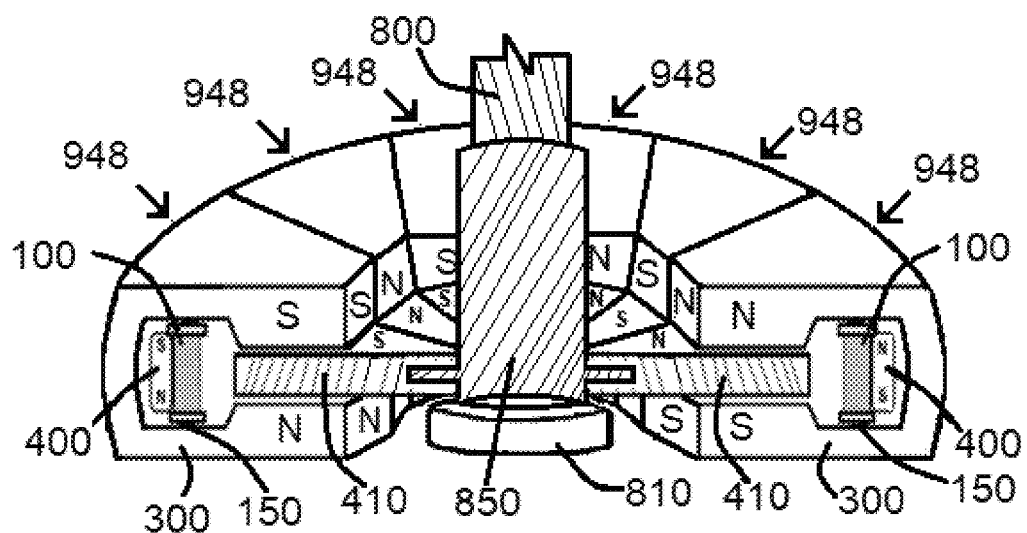
FIG. 2 illustrates the preferred configuration of this present invention showing a cut out, side angle view of a plurality of impulse units, each having a coil with a core made up of permeable material with a cylinder permanent magnet axially magnetized alongside the said coil; whereby the plurality of impulse units is encasing a plurality of alternating polarity rotor magnets, affixed horizontally to a rotor; and whereby the rotor sits on and is attached to a rotor bearing at the bottom and a shaft affixed to the top of the said rotor.
Figure 3A:
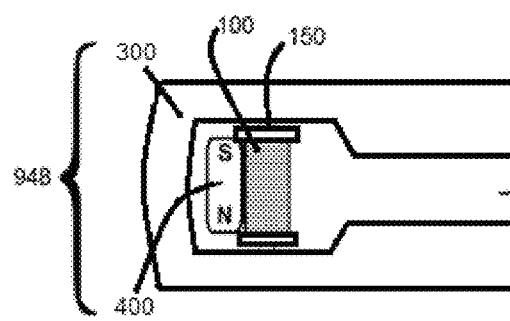
FIG. 3A illustrates a side view of the impulse unit which includes the magnetic field conduit made up of permeable material with a gap at one end and contained within it a coil with an iron or other permeable material core, and an adjacent permanent magnet.
Figure 3B:
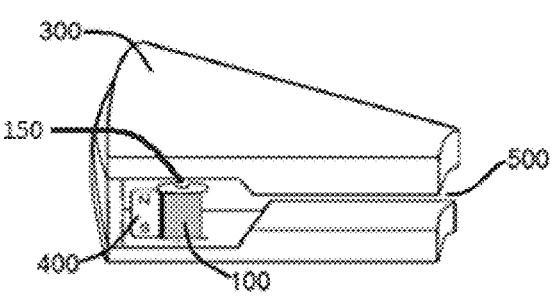
FIG. 3B illustrates an angled side view of the magnetic impulse unit which includes the magnetic field enclosure made up of permeable material with a gap at one end and contained within it a coil with an iron or other permeable material core, and an adjacent permanent magnet of the present invention.
Figure 20:
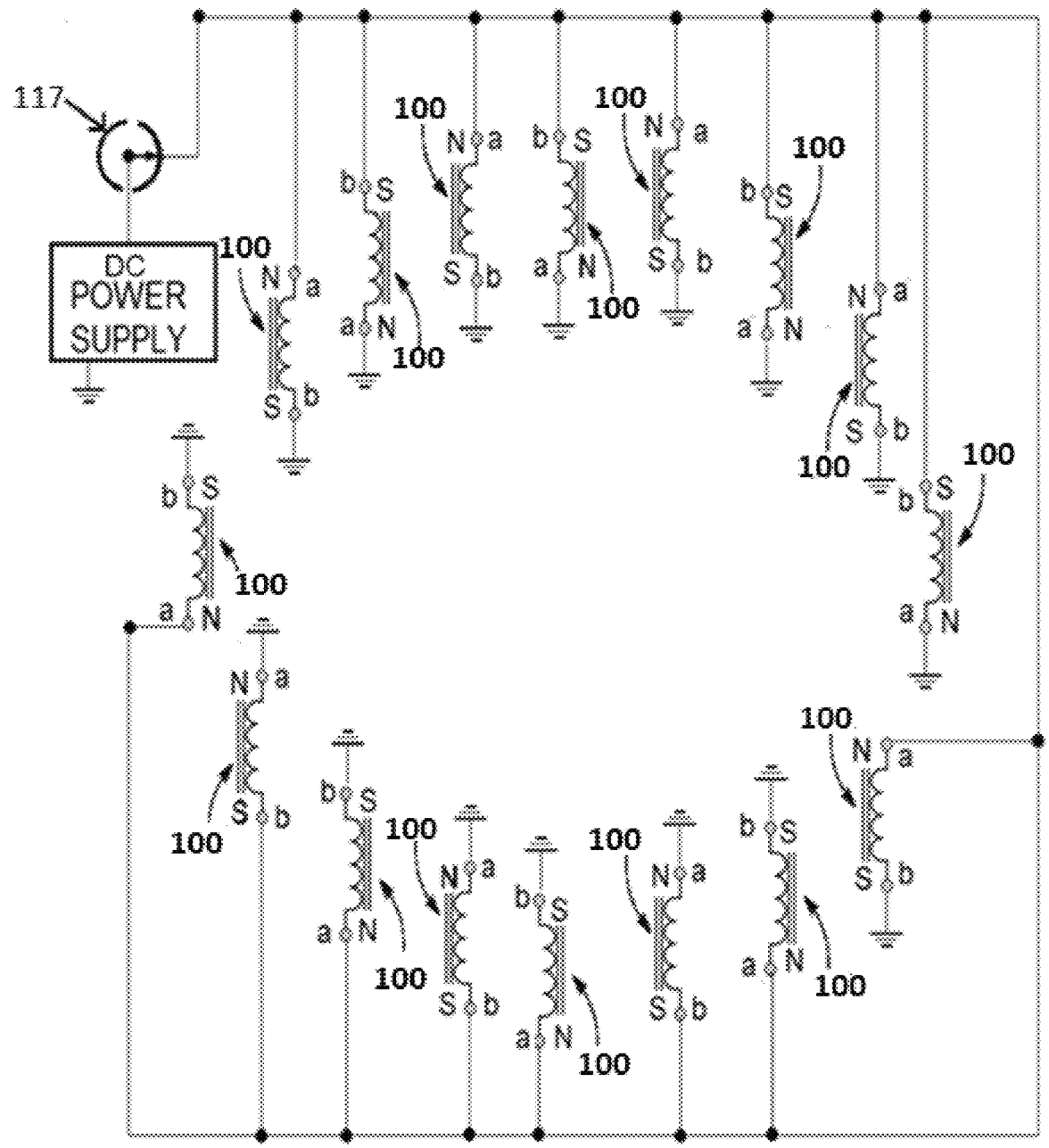
FIG. 20 illustrates the preferred configuration of this present invention showing a diagram of the electric circuit which current is supplied by a DC power source through the rotary switch, wired in parallel to the stator coils in one phase and through the said rotary switch to an open circuit in the next phase; and the alternate wiring indicated by contact 'a' and contact 'b', whereby DC current goes into one impulse unit coil through the 'a' contact and out the 'b' contact, and at the same time being in parallel, enters the adjacent impulse unit coil through the 'b' contact and out the 'a' contact and so on, to cause the polarity of each impulse unit coil to be opposite its adjacent impulse unit coils at the same time.
Figure 30:
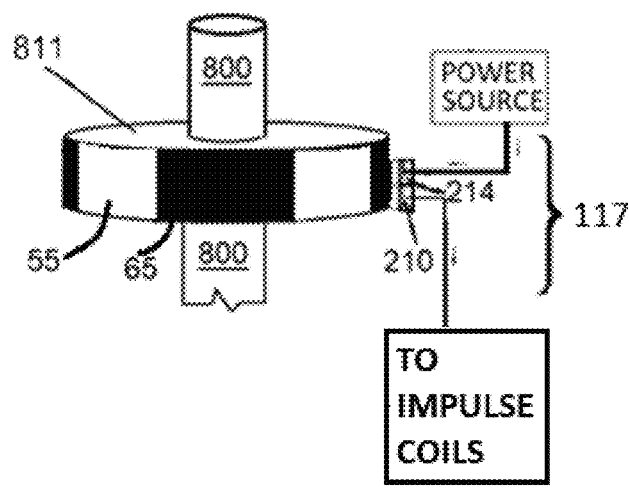
FIG. 30 illustrates the preferred configuration of this present invention showing a side angle view of the flywheel, with copper contacts and none conductive material contacts fastened to the flywheel with three motor brushes strategically positioned on its outside edge; whereby the motor brushes act as a current conduit turning the said current on and off to the impulse unit coil in a synchronized manner.

As shown in illustration FIG. 1, the invention is an electric motor. In its preferred embodiments the present invention is powered by a DC power supply through a rotary switch as shown in FIG. 20, 317, FIG. 30. In the preferred embodiments of the present invention, it is further comprised of a plurality of impulse units 948; and is best illustrated in FIG. 2, FIG. 3A and FIG. 3B. The impulse unit 948 is made up of a magnetic field conduit, 300 which is made of permeable material, having an opening in at least one end for a magnetic field to cross; and coupled with a coil 100, an iron core or other permeable material 150; and with a permanent magnet 400, positioned alongside the coil 100.

Figure 4:
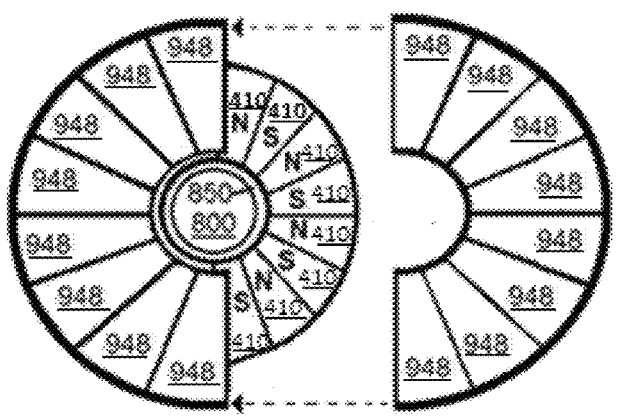
FIG. 4 illustrates a top view with the impulse units pulled apart showing the rotor magnets encased within the impulse units, in the preferred embodiments of the present invention.
Figure 5:
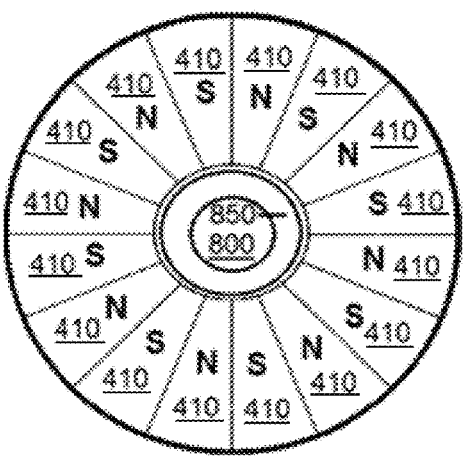
FIG. 5 illustrates a top view of the rotor, shaft, and position and polarity orientations of each rotor magnet in the present invention.
Figure 6:
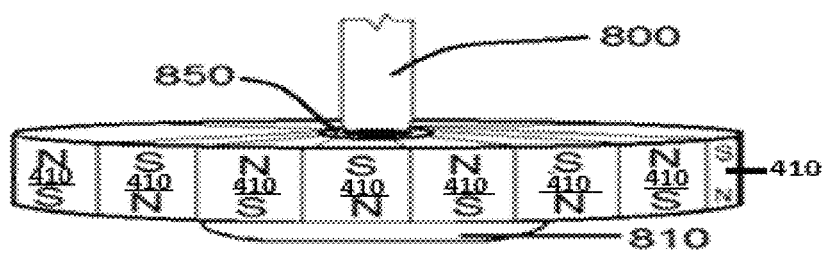
FIG. 6 illustrates a side angle side view of the rotary bearings, the rotor magnets, the rotor and the shaft in the preferred embodiments of the present invention.

In the preferred embodiments of the present invention, as shown in FIG. 4, 410, FIG. 5, 410, and FIG. 6, 410 has a plurality of rotor wedge magnets 410, axially magnetized and affixed tightly together, with the individual wedge magnets polarity oriented opposite to their adjacent wedge magnets and attached horizontally to the rotor 850; which said rotor is affixed to the shaft 800 and is thereby attached to and sits on a rotary bearing 810 in the preferred embodiment. As shown in FIG. 2, 948 and FIG. 4, 948 these individual impulse unit 948 encompassing the plurality of permanent wedge magnets 410.

Figure 9:
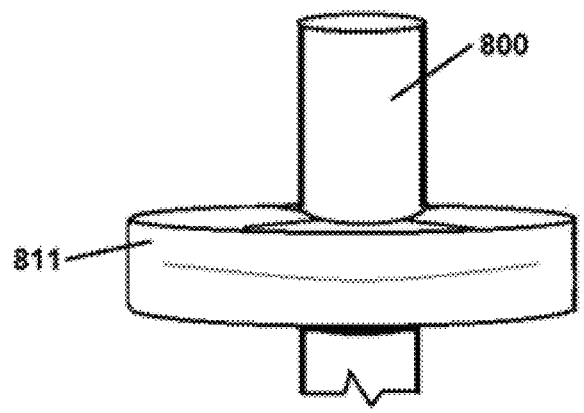
FIG. 9 illustrates a side angle view of the flywheel within the present invention.

In this preferred embodiment, the flywheel 811 illustrated in FIG. 1, FIG. 9 and FIG. 30, evens out the inertia, when sudden uneven surges are created by the repulsion and attraction forces of the impulse unit coils 100 verses the impulse unit permanent magnets 400; and because the flywheel is absorbing the mechanical energy, it causes the rotational speed of the rotor 850 and shaft 800 to remain at a steady speed of rotation.

Further, in the preferred embodiment the flywheel 811 is combined with a rotary switch 117 as shown in FIG. 1 and FIG. 30; thereby the flywheel is acting as the commuter. The switching of the DC current between the impulse unit coils 100 and an open circuit, in the preferred embodiment is done through the aforementioned switch 117 as illustrated in FIG. 1 and FIG. 30; showing copper contacts 55 and non-conducting material contacts 65 strategically positioned and attached to the outside rim of the flywheel 811. The two brushes 210, 214 are supported by a structure 75, held and positioned against the flywheel contacts 55 and 65.

One brush 214 takes DC current from a DC power source and supplies it to the motor brush 210 through the copper contact 55 when the motor brushes 210 and 214 come in contact together with the same copper contact 55.

Figure 21:
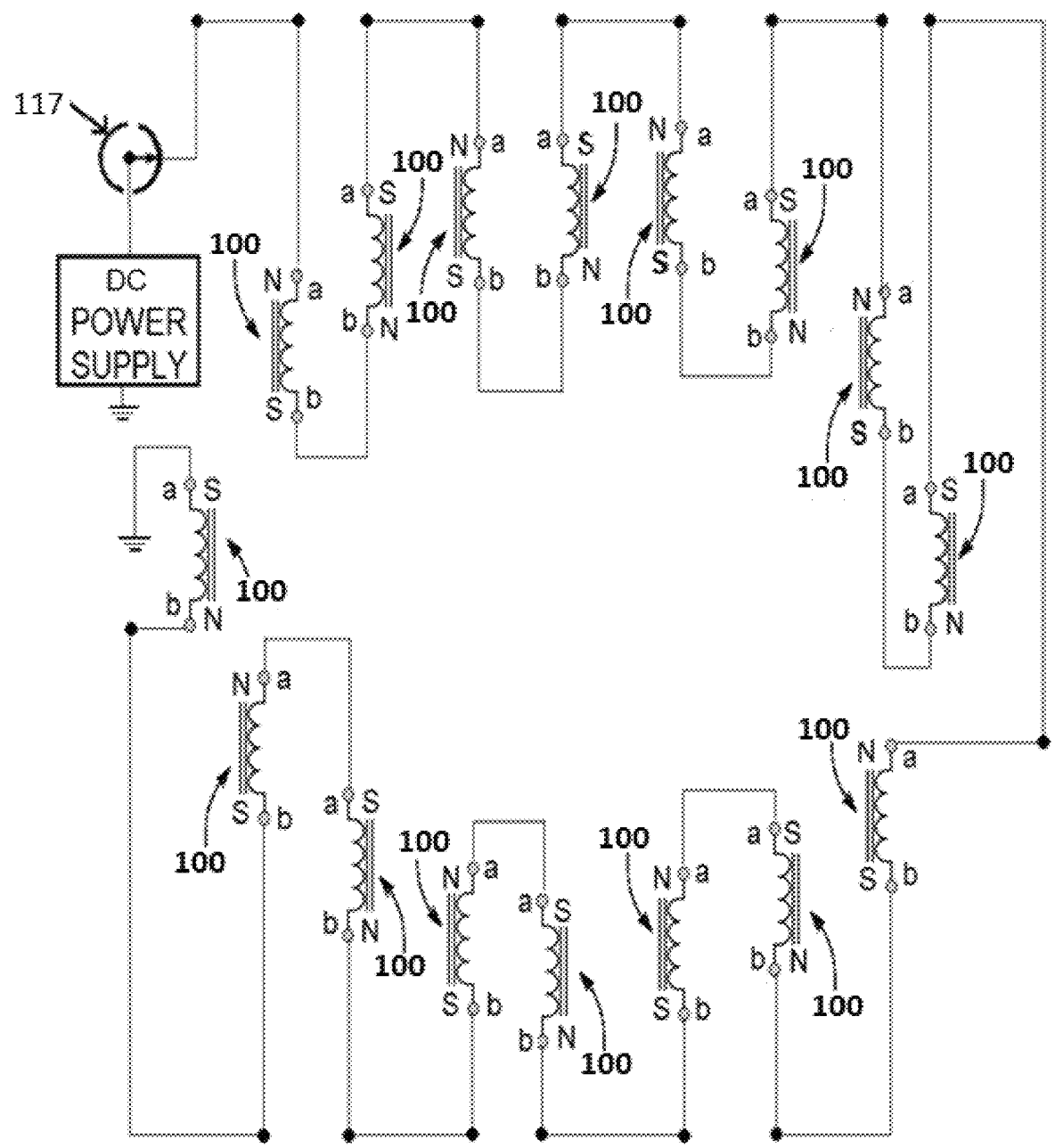
FIG. 21 illustrates an alternate configuration of this present invention showing a diagram of the electric circuit which current is supplied by a DC power source through the rotary switch, wired in series to the impulse unit coils from the rotary switch in one phase and through the said rotary switch to an open circuit in the next phase; and the alternate wiring indicated by contact 'a' and contact 'b'. Whereby, DC current goes into one impulse unit coil through the 'a' contact and out the 'b' contact, and into the next impulse unit coil through the 'b' contact and out the 'a' contact to cause the polarity of each impulse unit coil to be opposite its adjacent impulse unit coil at the same time.

When the motor brushes 210 and 214 come in contact together with the non-conductive material contact 65 no electricity is transferred to the coils 100 as shown in FIG. 20 where the circuit is in parallel in the preferred embodiment; and in the alternate embodiment as shown in FIG. 21 where the circuit is in series.

This conserves energy, as the impulse permanent magnets 400 polarity being opposite to the energized impulse coil 100 within the same impulse unit 948, takes precedence in the magnetic field conduit gap 500 as previously explained; providing repulsion and attraction to the rotor magnets 410 as a natural property of permanent magnets.

Figure 10:
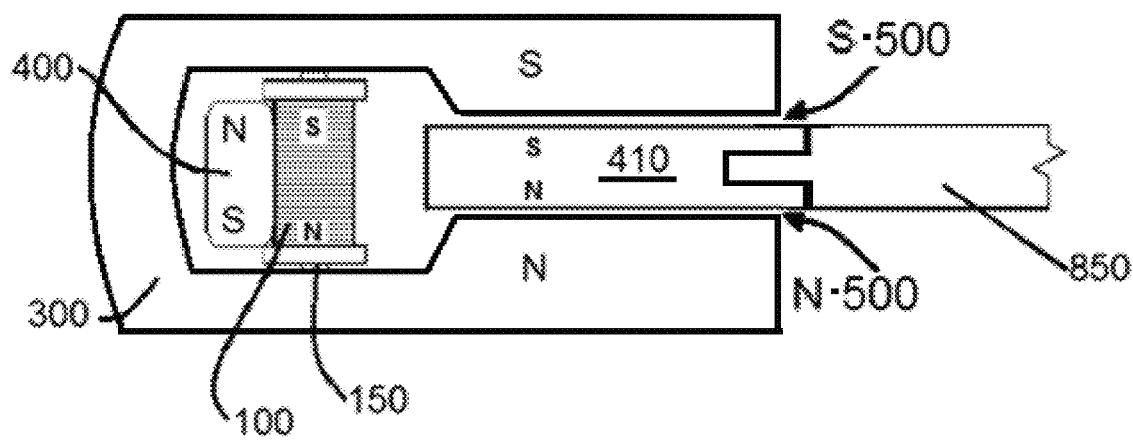
FIG. 10 illustrates a side view of the impulse unit with its coil energized whereby the rotor magnet has a top polarity being south pole and bottom polarity being north pole, are in the impulse unit magnetic field enclosure gap. The polarity of the top 50% of the impulse unit magnetic field conduit gap is south pole and 50% of the bottom said impulse unit magnetic field conduit gap is north pole; and which the rotor magnets are attached to the rotor.
Figure 11:
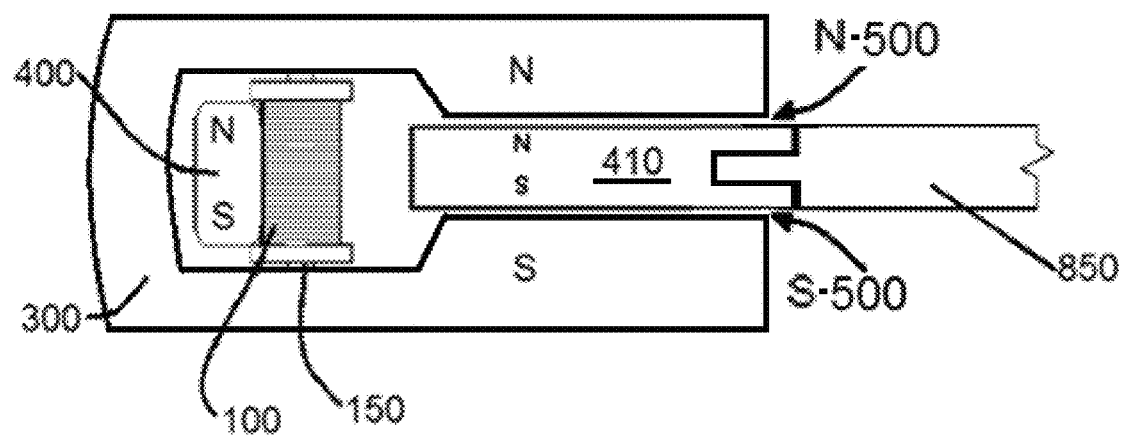
FIG. 11 illustrates a side view of the impulse unit with its coil not energized and whereby the rotor magnet has a top polarity being north pole and bottom polarity being south pole, are in the impulse unit magnetic field conduit gap. The polarity of the top 50% of the impulse unit magnetic field conduit gap is north pole and 50% of the bottom said impulse unit magnetic field conduit gap is south pole; and which the rotor magnets are attached to the rotor.
Figure 12:
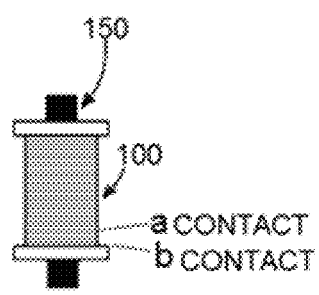
FIG. 12 illustrates a side view of the impulse unit coil with an iron core or other permeable material and showing input contacts 'a' and 'b'.
Figure 13:
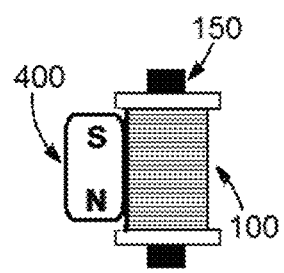
FIG. 13 illustrates a side view of the impulse unit coil with impulse unit permanent magnet along its length whereby the impulse unit permanent magnet is axially magnetized.
Figure 14:
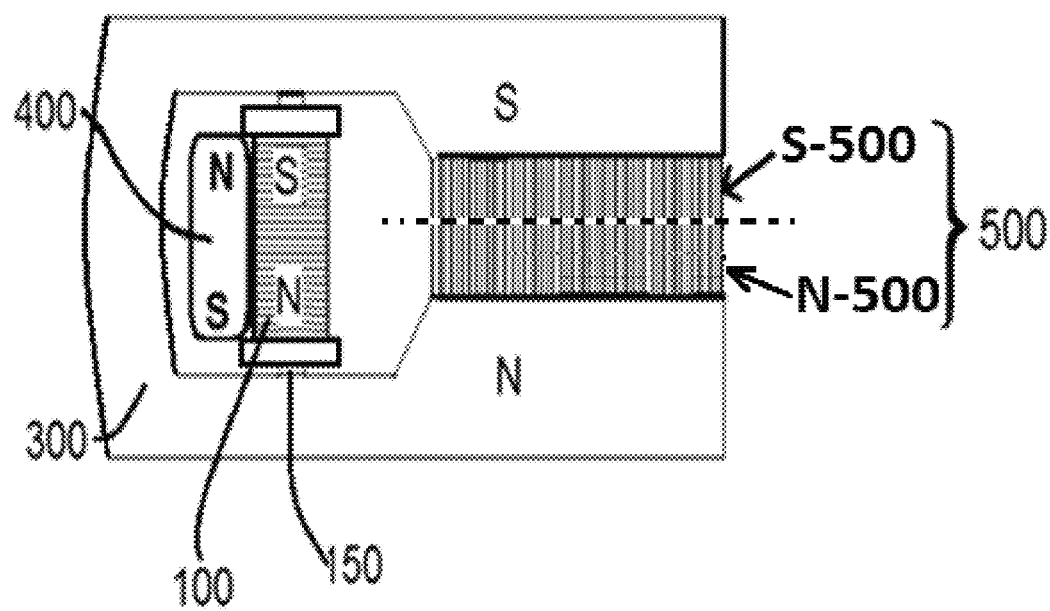
FIG. 14 illustrates a side view of the impulse unit showing the direction of the magnetic field within the gap of the impulse unit magnetic field conduit; whereby the top 50% of the impulse unit magnetic field conduit gap polarity is south pole and the bottom 50% of the impulse unit magnetic field conduit gap is North pole, when the impulse unit coil is energized.
Figure 15:
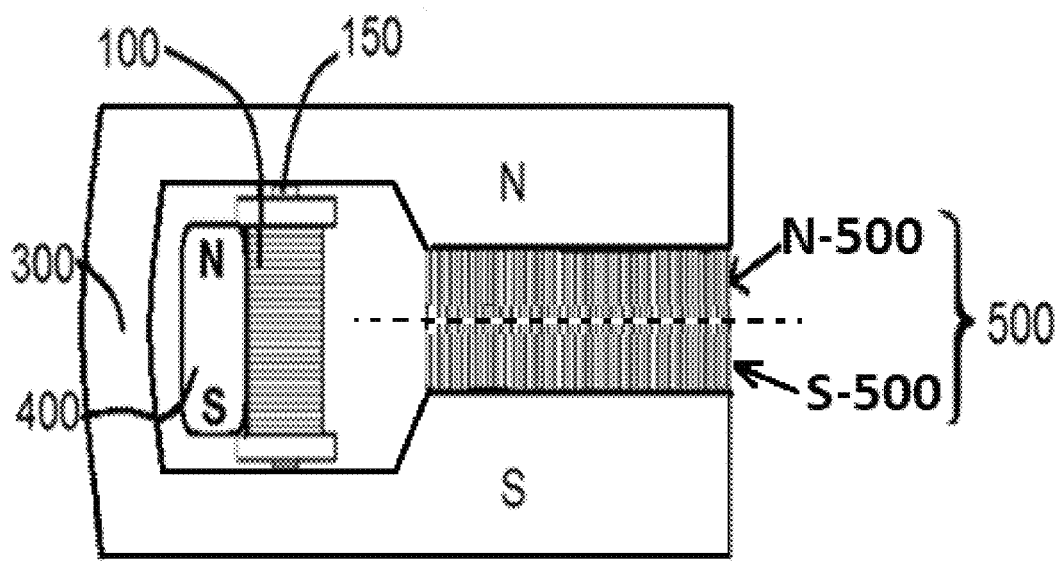
FIG. 15 illustrates a side view of the impulse unit; whereby the top 50% of the impulse unit magnetic field conduit gap polarity is north pole and the bottom 50% of the impulse unit magnetic field conduit gap is south pole, when the impulse unit coil is not energized.

When the impulse unit coils 100 are energized from the DC power source through the switch 117, the magnetic field of the impulse unit permanent magnets 400 in the impulse unit 948 is collapsed as shown in FIG. 10, S-500, N-500 and FIG. 14, S-500, N-500; where S-500 signifies south polarity and N-500 signifies north polarity and N on the impulse unit coil 100 signifies the North pole of the impulse unit coil; and S on the impulse unit coil 100 signifies the South pole of the impulse unit coil. Further, N on the impulse unit permanent magnet 400 signifies the North pole; and S on the impulse unit permanent magnet 400 signifies the South pole.

In this energized impulse unit coil phase the magnetic field of the impulse unit coil 100 takes precedence in the impulse unit magnetic field conduit gap 500; whereby the top 50% of the impulse unit magnetic field conduit gap 500 polarity equals south pole S-500 or north pole N-500 and the bottom 50% has opposite polarity to the top 50% of the impulse unit magnetic field conduit gap 500. This matches the poles of the impulse unit coils 100 when the impulse unit coils 100 are energized and results in repulsion.

Figure 16:
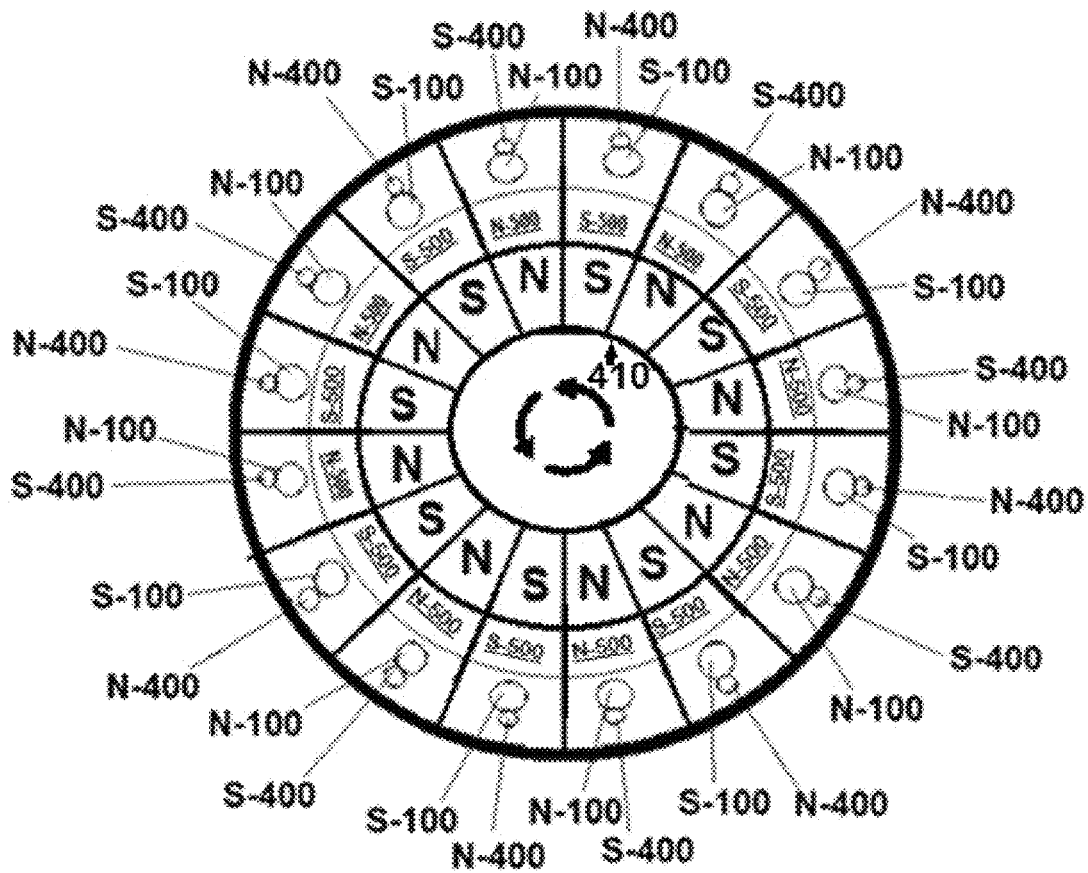
FIG. 16 shows a top view chart of the magnetic field polarity of each impulse unit permanent magnet, impulse unit coil and of each rotor magnet in relationship to the top 50% magnetic field polarity of the impulse unit magnetic field conduit gap when the said impulse unit coils are energized.
Figure 17A:
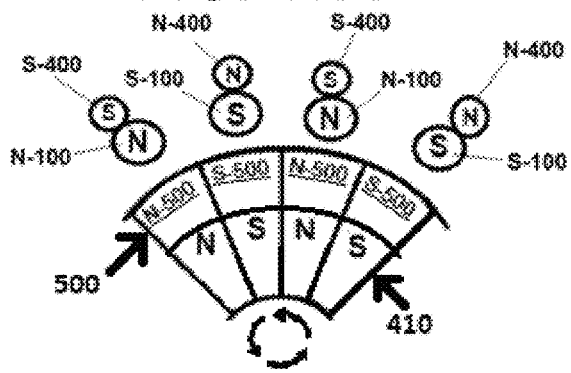
FIG. 17A shows a top view close-up section of the chart in FIG. 16 showing four segments of the magnetic field polarity of each impulse unit permanent magnet, impulse unit coil and of each rotor magnet in relationship to the top 50% magnetic field polarity of the impulse unit magnetic field conduit gap when the said impulse unit coils are energized.
Figure 17B:
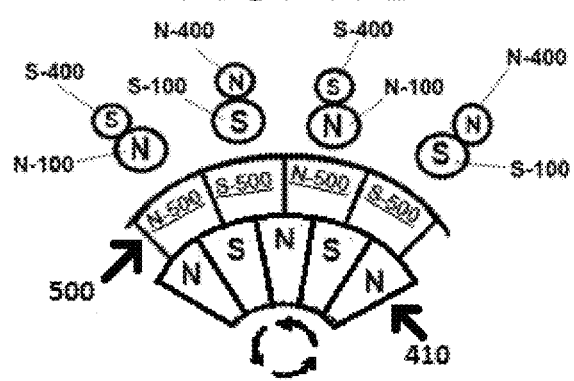
FIG. 17B illustrates a top view close-up section of FIG. 16 showing four segments of the magnetic field polarity of each impulse unit permanent magnet and impulse unit coil and five segments of the magnetic field polarity of each rotor magnet in relationship to the top 50% magnetic polarity in four impulse unit magnetic field conduit gaps, when the impulse unit coils are energized and the rotor magnets are half way through the energized cycle.

FIG. 16, FIG. 17A, FIG. 17B, FIG. 18, FIG. 19A, FIG. 19B. In FIG. 16, FIG. 17A and FIG. 17B, illustrates the impulse unit magnetic field conduit gap 500 polarity relative to the rotor magnets, the impulse unit coil and impulse unit permanent magnet; wherein it indicates the top pole polarity relationship of the energized impulse unit coils 100 top poles, to that of the impulse unit permanent magnets 400 top poles and the resulting polarity of the top 50% of the impulse unit magnetic field conduit gap 500; whereby equaling north pole N-500 or south pole S-500, as it further relates to the rotor magnets 410 top pole. Therefore, S represents the south pole and N represents the north pole; and where 100 is the impulse unit coil 100 of the impulse unit 948 and 400 is the impulse unit permanent magnet 400 of the impulse unit 948; and 500 represents the gap 500, 501 in the impulse unit magnetic field conduit 15, 300, 301, 305, 306, 308, 151A and B. It is self evident that the bottom polarity would be opposite to the top polarity. Therefore, S-400 represents south pole polarity of the top pole of the impulse unit permeant magnet 400 and is self evident that the bottom pole is in opposite polarity to the top pole.

The impulse unit coil 100 polarity is indicated by N-100 representing north pole polarity of the top pole of the impulse unit coil 100 and is self evident that the bottom pole is in opposite polarity to the top pole; and N-400 represents north pole polarity of the top pole of the impulse unit permanent magnet 400 and is self evident that the bottom pole is in opposite polarity to the top pole; and where S-100 represents south pole polarity of the top pole of the impulse unit coil 100 and is self evident that the bottom pole is in opposite polarity to the top pole; and where N-500 represents the top 50% of the impulse unit magnetic field conduit gap 500 with north pole polarity and is self evident that the bottom 50% is in opposite polarity. Conversely where S-500 represents the top 50% of the impulse unit magnetic field conduit gap 500 with south pole polarity and is self evident that the bottom 50% is in opposite polarity.

Figure 18:
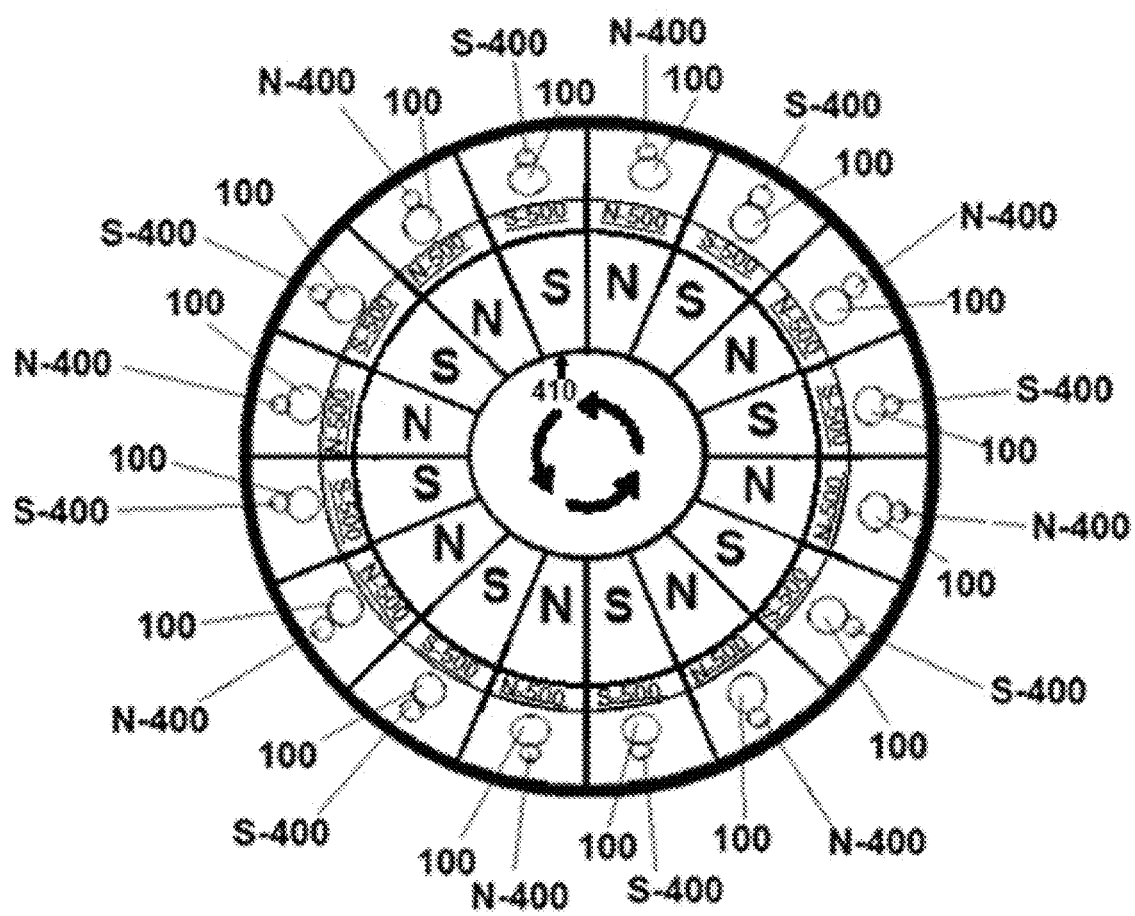
FIG. 18 shows a top view chart of the magnetic field polarity of each impulse unit permanent magnet, impulse unit coil and of each rotor magnet in relationship to the top 50% magnetic field polarity of the impulse unit magnetic field conduit gap when the said impulse unit coils are not energized.
Figure 19A:
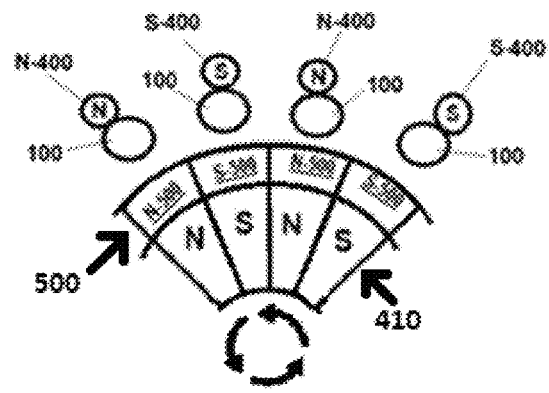
FIG. 19A shows a top view close-up section of FIG. 18 showing four segments of the magnetic field polarity of each impulse unit permanent magnet, impulse unit coil and of each rotor magnet in relationship to the top 50% magnetic field polarity of the impulse unit magnetic field conduit gap when the said impulse unit coils are not energized.
Figure 19B:
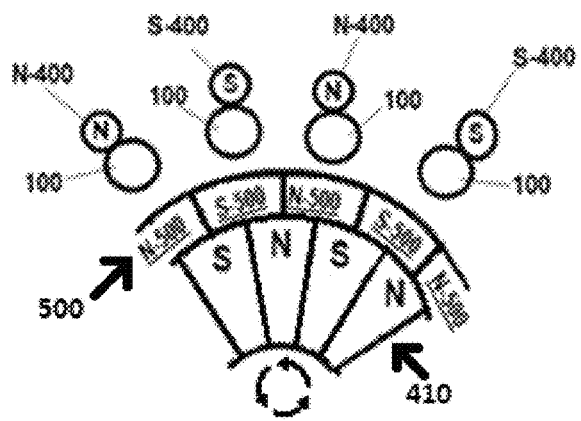
FIG. 19B showing a top view close-up section of FIG. 18 showing four segments of the magnetic field polarity of each impulse unit permanent magnet and impulse unit coil and four segments of the magnetic field polarity of each rotor magnet in relationship to the top 50% magnetic polarity in five impulse unit magnetic field conduit gaps, when the impulse unit coils are not energized and the rotor magnets are half way through the energized cycle.

In FIG. 18, FIG. 19A and FIG. 19B, the charts show the polarity relationship of the 'none' energized impulse unit coils 100, to that of the top pole polarity of impulse unit permanent magnets 400 and the resulting top 50% polarity of the impulse unit magnetic field conduit gap 500 as it further relates to the top pole of rotor magnets 410; and is self evident that the bottom 50% polarity is opposite the top 50% polarity. Therefore, S represents the south pole and N represents the north pole; and where 100 is the impulse unit coil 100 of the impulse unit 948; and 500 represents the impulse unit magnetic field conduit gap 500 in the impulse unit 948. Whereby 400 is the impulse unit permanent magnet of the impulse unit 948. Therefore, S-400 represents south pole polarity of the top pole of the impulse unit permanent magnet 400; N-400 represents north pole polarity on the top pole of the impulse unit permanent magnet 400 and is self evident that the bottom pole is in opposite polarity to the top pole; and where N-500 represents north pole polarity of the top 50% of the impulse unit magnetic field conduit gap 500 and is self evident that the bottom 50% is in opposite polarity to the top 50% of the impulse unit magnetic field conduit gap 500. Conversely where S-500 represents south pole polarity of the top 50% of the impulse unit magnetic field conduit gap 500 and is self evident that the bottom 50% is in opposite polarity to the top 50% of the impulse unit magnetic field conduit gap 500. Further, 100 represents the impulse unit coil 100 with no current going through it and is considered none polar or not relative.

In FIG. 17A, FIG. 17B, FIG. 19A and FIG. 19B you can see a close up of the magnetic fields in the top 50% of the impulse unit magnetic field conduit gap 500; whereby S-500 represents South pole polarity of the top 50% of that impulse unit magnetic field conduit gap and would be self evident that the bottom 50% of that impulse unit magnetic field conduit gap 500 has opposite polarity being north polarity N-500. And where N-500 resenting north pole polarity of the top 50% of that impulse unit magnetic field conduit gap 500 and would be self evident that the bottom 50% of that impulse unit magnetic field conduit gap 500 has opposite polarity being south polarity S-500. Most importantly the impulse unit magnetic field conduit gaps 500 top 50% polarity is of opposite polarity to the top 50% of the adjacent impulse unit magnetic field conduit gaps 500 polarity; and is self evident that the impulse unit magnetic field conduit gaps bottom 50% polarity is opposite polarity to the top 50% of the adjacent impulse unit magnetic field conduit gaps 500 polarity.

As shown in FIG. 17B and FIG. 19B, whereby the rotor magnets synchronised by the switch 316, and where the rotor magnets 410 being half way through one phase; are being repelled out of the one impulse unit magnetic field conduit gap 500, having the same polarity as the impulse unit magnetic field conduit gap S-500 or south polarity and at the same time being attracted to the adjacent impulse unit magnetic field conduit gap N-500 or north polarity, which is opposite polarity to the said rotor magnet 410 which top pole is south polarity.

As illustrated in FIG. 20 of the preferred embodiment, and FIG. 21 in the alternate embodiment, the energization and non-energization of the impulse unit coils 100 are synchronized to the position of the rotor magnets 410 in two phases via way of the switch 117.

In the first phase, when the rotor magnets are directly aligned in the impulse unit magnetic field conduit gap 500, the switch 117 sends all its current to all the impulse unit coils 100. In the second phase of the preferred embodiment of the present invention, the current is sent to an open circuit shutting power off to the impulse unit coils 100; thereby conserving energy. There are several alternate configurations to the switch which embodiments are stipulated later in this description.

DC current from a DC power source is controlled by a rotary switch 117 in the preferred embodiment as shown in FIG. 30; resulting in a synchronized and controlled alternating polarity in the impulse unit magnetic field conduit gap 500, as previously explained and illustrated in the diagram of FIG. 16, FIG. 17A, FIG. 17B, FIG. 18, FIG. 19A, and FIG. 19B.

Figure 22:
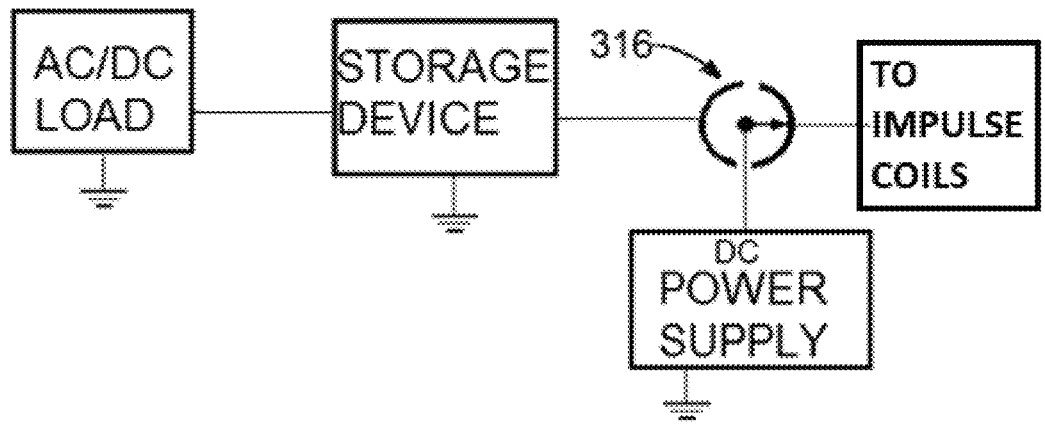
FIG. 22 illustrates an alternate configuration of this present invention showing a diagram whereby the DC power source through the rotary switch in FIG. 20

As shown in FIG. 22 the switch 316, in the alternate embodiments, sends current in one phase to all the impulse unit coils 100 and in the next phase to a storage device which is electronically linked to a load.

Figure 23:
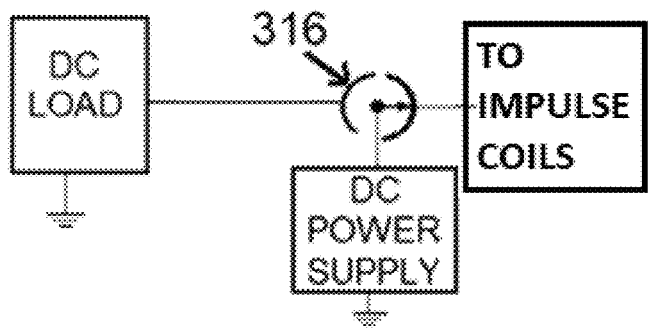
FIG. 23 illustrates an alternate configuration of this present invention showing a diagram whereby the DC power source through the rotary switch in FIG. 20

As shown in FIG. 23 in another alternate embodiment, the switch 316, sends current in one phase to all the impulse unit coils 100 and in the next phase, directly to a load.

Figure 24:
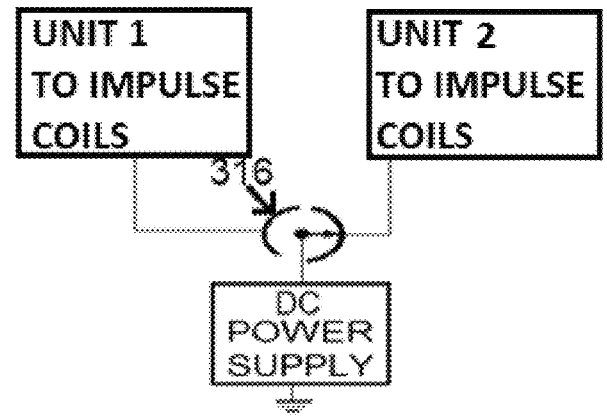
FIG. 24 illustrates an alternate configuration of this present invention showing a diagram; whereby the DC power source, through rotary switch in FIG. 20

Further, in another alternate embodiment as shown in FIG. 24 the switch 316, operates two motors of the present invention, by sending current in one phase to all the impulse unit coils of 'UNIT 1' and in the next phase to all the impulse unit coils of 'UNIT 2'; whereby operating two motors of the present invention with the same energy as would run one normal electric motor.

Figure 31:
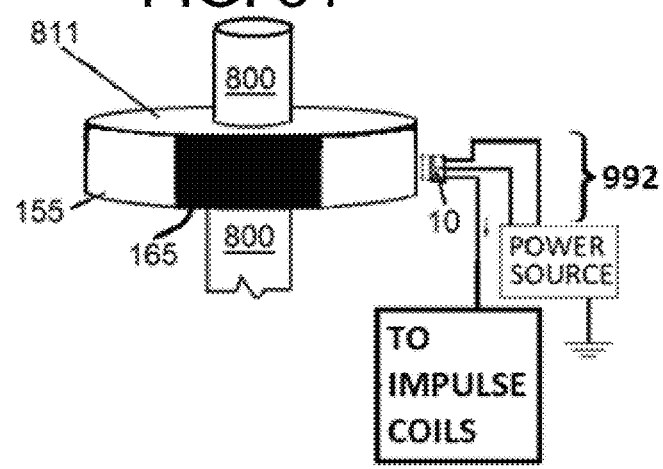
FIG. 31 illustrates an alternate configuration of this present invention showing an angled side view of the flywheel being used as a commuter with a plurality of magnets strategically positioned and attached to the flywheel and one hall sensor positioned on the outside edge of the flywheel; whereby the hall sensor turns the current off and on to the impulse unit coil in a synchronized manner.

There are several other alternative embodiments of the present invention regarding the switching mechanism. An alternate configuration as shown in FIG. 31, involves the flywheel 811 acting as the commuter whereby a plurality of magnets strategically positioned and attached to the flywheel 811 and a switch 992 comprising of one hall sensor 10 positioned on the outside edge of the flywheel; whereby the hall sensor turns the current on and off to the impulse unit coils at the correct time. The timing is the same as the motor brushes 210, 214 configurations and has been explained previously in this description.

Figure 32:
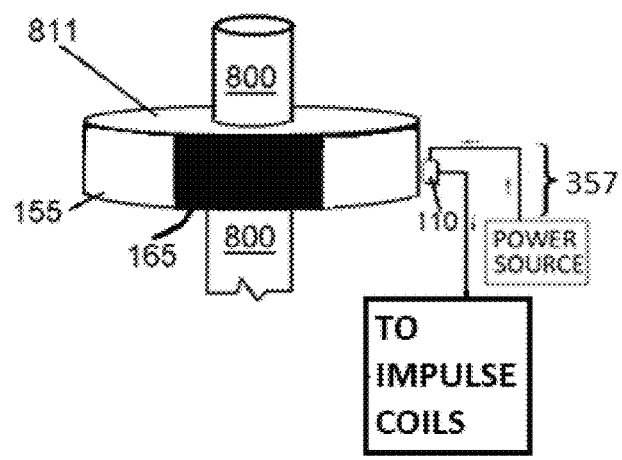
FIG. 32 illustrates an alternate configuration of this present invention showing an angled side view of the flywheel being used as a commuter with plurality of magnets strategically positioned and attached to the flywheel and two Reed switches positioned on the outside edge of the flywheel; whereby the reed switch turns the current off and on to the impulse unit coil in a synchronized manner.

Another alternate configuration as shown in FIG. 32, involves the flywheel 811 acting as the commuter whereby a plurality of magnets strategically positioned and attached to the flywheel 811 and a switch 357 comprising one reed switch 110 positioned on the outside edge of the flywheel; whereby the reed switch turns the current on and off to the impulse unit coils at the correct time. The timing is the same as the motor brushes 210, 214 configuration and has been explained previously in this description.

Figure 36:
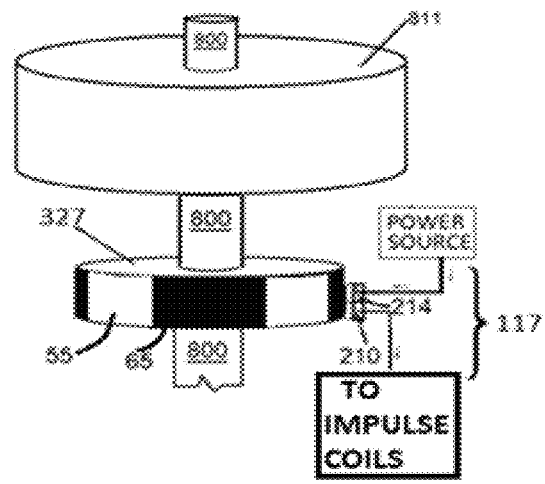
FIG. 36 illustrates an alternate configuration of this present invention showing an angled side view of the flywheel separate from the commuter, which is attached to the shaft; whereby copper contacts and non-conducting material is strategically positioned and attached to the commuter wheel. Also shown are two motor brushes positioned on the outside edge of the commuter; whereby the motor brushes act as a current conduit turning the said current on and off to the impulse unit coil in a synchronized manner.

There are several other alternative embodiments of the present invention regarding the switching mechanism and the commuter acting separately from the flywheel 811. An alternate configuration as shown in FIG. 36, involves the flywheel 811 being separate from the commuter wheel 327; whereby the commuter wheel 327 has copper contacts 55 and non-conducting contacts 65 attached strategically to the commuter wheel 327 and the brushes 210 and 214 making up the switch 117 are positioned on the outside edge of the commuter wheel 327; whereby the switch 117 turns the current on and off to the impulse unit coils at the correct time. The timing is the same as the preferred embodiment where the commuter and the flywheel 811 are combined as has been explained previously in this description.

Figure 37:
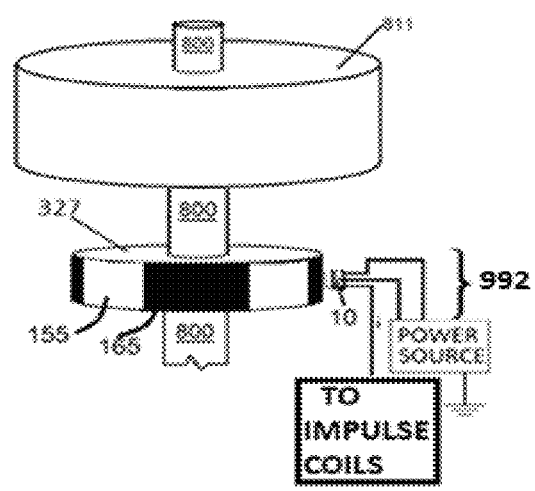
FIG. 37 illustrates an alternate configuration of this present invention showing an angled side view of the flywheel and a separate commuter on the shaft, with a plurality of magnets strategically positioned and attached to a wheel; and on hall sensor positioned on the outside edge of the wheel, whereby the hall sensor turns the current off and on to the impulse unit coil in a synchronized manner.

Another alternate configuration as shown in FIG. 37, involves the flywheel 811 being separate from the commuter wheel 327; whereby the commuter wheel 327 has a plurality of magnets strategically positioned and attached to the commuter wheel 327 and a switch 992 comprising of one hall sensor 10 positioned on the outside edge of the commuter wheel; whereby the hall sensor 10 turns the current on and off to the impulse unit coils 100 at the correct time. The timing is the same as the motor brushes configuration and has been explained previously in this description.

Figure 38:
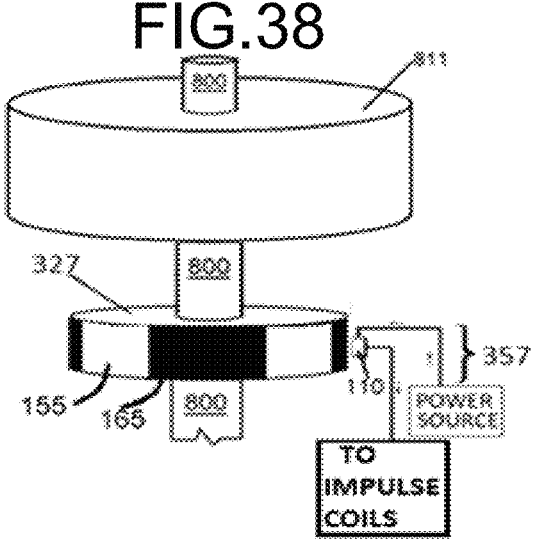
FIG. 38 illustrates an alternate configuration of this present invention showing an angled side view of the flywheel and a separate commuter on the shaft, with a plurality of magnets strategically positioned and attached to the wheel and two reed switches positioned on the outside edge of the wheel; whereby the reed switch turns the current off and on to the impulse unit coil in a synchronized manner.
Figure 39:
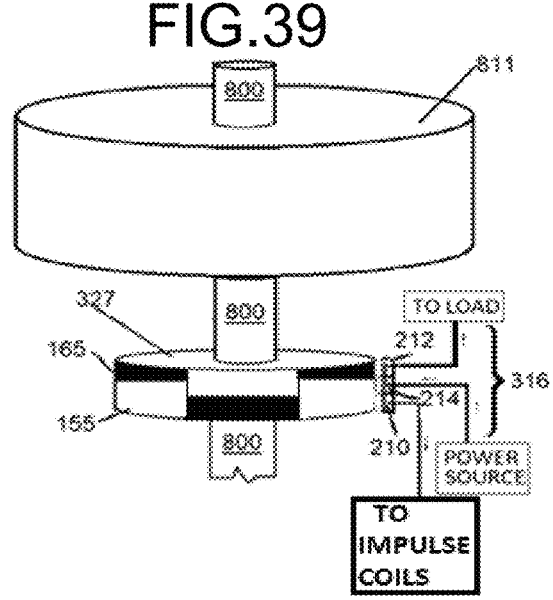
FIG. 39 illustrates an alternate configuration of this present invention showing an angled side view of the flywheel separate from the commuter, which is attached to the shaft; whereby copper contacts and non-conducting material is strategically positioned and attached to the commuter wheel. Also shown are three motor brushes positioned on the outside edge of the commuter; whereby the brushes are a conduit for current to the said current between the impulse unit coil and an open circuit or load(s).
Figure 40:
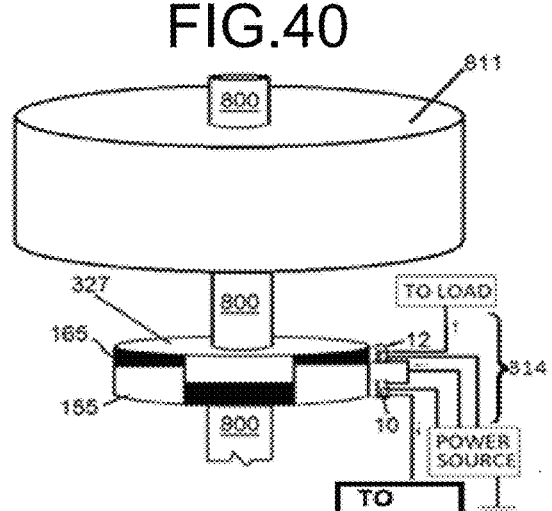
FIG. 40 illustrates an alternate configuration of this present invention showing an angled side view of the flywheel and a separate commuter on the shaft, with a plurality of magnets strategically positioned and attached to a wheel; and two hall sensors positioned on the outside edge of the wheel, whereby the hall sensors alternate the current between the impulse unit coil and open circuit or load(s).
Figure 41:
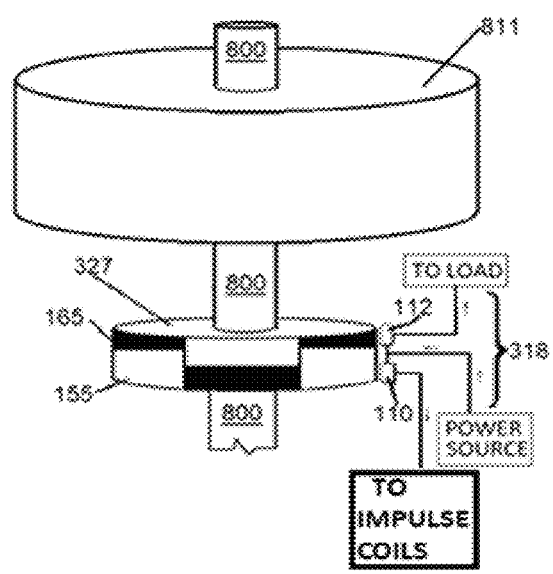
FIG. 41 illustrates an alternate configuration of this present invention showing an angled side view of the flywheel and a separate commuter on the shaft, with a plurality of magnets strategically positioned and attached to the wheel and two reed switches positioned on the outside edge of the wheel; whereby the reed switches alternate the current between the impulse unit coil and open circuit or load(s).
Figure 42:
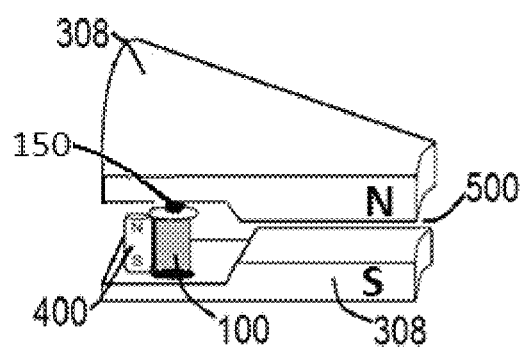
FIG. 42 illustrates an alternate configuration of this present invention showing an angled side view of a impulse unit which includes an alternate impulse unit magnetic field conduit which is open at the magnet side and at the opposite end, and whereby it is made up of permeable material and contained within it a coil with an iron or other permeable material core, and an adjacent permanent magnet.

Another further alternate configuration as shown in FIG. 38, involves the flywheel 811 being separate from the commuter wheel 327; whereby the commuter wheel 327 has a plurality of magnets strategically positioned and attached to the commuter wheel 327 and a switch 357 comprising of one reed switch 110 positioned on the outside edge of the commuter wheel; whereby the reed switch turns the current on and off to the impulse unit coils at the correct time. The timing is the same as the motor brushes configuration and has been explained previously in this description.

Figure 33:
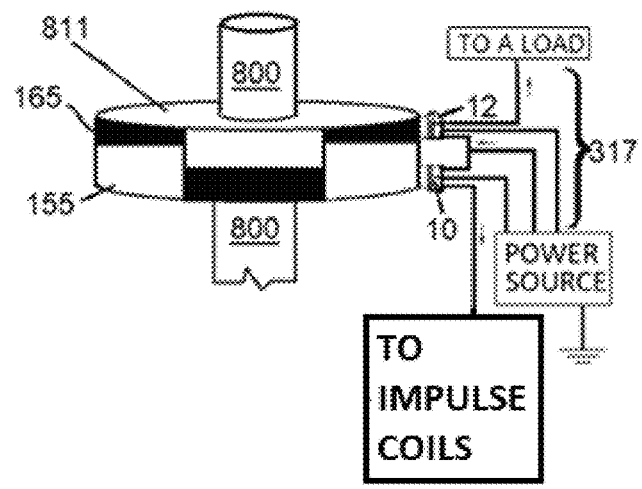
FIG. 33 illustrates an alternate configuration of this present invention showing an angled side view of the flywheel being used as a commuter with a plurality of magnets strategically positioned and attached to the flywheel and two hall sensors positioned on the outside edge of the flywheel; whereby the hall sensors alternate the current between the impulse unit coil and open circuit or load(s).

Another alternate configuration as shown in FIG. 33 involves the flywheel being used as a commuter with a plurality of magnets strategically positioned and attached to the flywheel and a switch 317 comprising two hall sensors positioned on the outside edge of the flywheel; whereby the hall sensors alternate the current between the impulse unit coils and a load(s) as show also shown in FIG. 22, FIG. 23 and FIG. 24.

Figure 34:
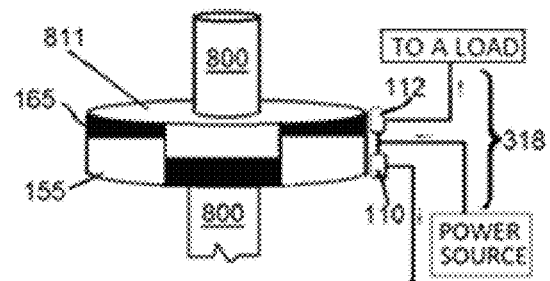
FIG. 34 illustrates an alternate configuration of this present invention showing an angled side view of the flywheel being used as a commuter with plurality of magnets strategically positioned and attached to the flywheel and two Reed switches positioned on the outside edge of the flywheel; whereby the reed switches alternate the current between the impulse unit coil and open circuit or load(s).

Another alternate configuration of the present invention as shown in FIG. 34 involves the flywheel being used as a commuter with plurality of magnets strategically positioned and attached to the flywheel and a switch 317 comprising two Reed switches positioned on the outside edge of the flywheel; whereby the reed switches alternate the current between the impulse unit coils and a load(s) as shown in FIG. 22, FIG. 23 and FIG. 24.

Figure 35:
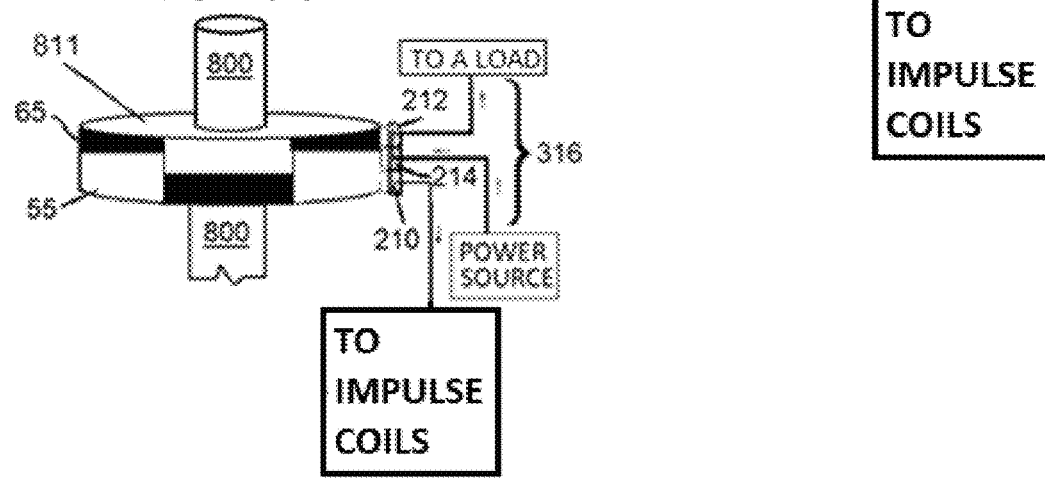
FIG. 35 illustrates alternate configuration of this present invention showing a side angle view of the flywheel, with copper contacts and the blocking contacts fastened thereon with three motor brushes strategically positioned and attached to the flywheel; whereby the motor brushes act as a conduit for current alternating the said current between the impulse unit coil and an open circuit or load(s).

Another alternate configuration of the present invention as shown in FIG. 35 involves the flywheel, with copper contacts and the none conducting contacts fastened thereon and a switch 316 comprising three motor brushes 210, 212, 214, strategically positioned and attached to the flywheel; whereby the motor brushes 210, 212, 214, act as a conduit sending current between the impulse unit coils and a load(s) as shown in FIG. 22, FIG. 23 and FIG. 24.

Figure 25:
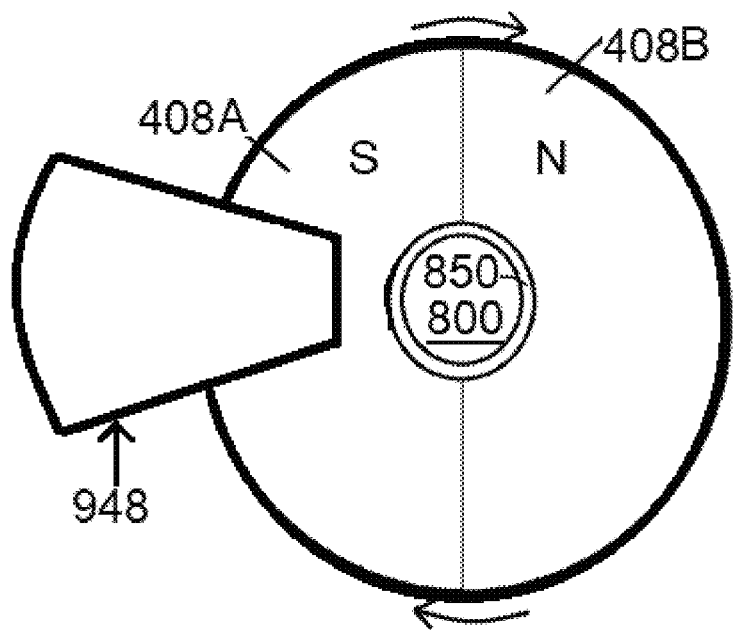
FIG. 25 illustrates an alternate configuration of this present invention showing a top view, whereby there is one impulse unit with two flat half circle permanent magnets, axially magnetized, affixed horizontally to a rotor which is affixed to a shaft rotating through the impulse unit magnetic field conduit gap; and whereby each of the two rotor magnets being oriented with opposite poles to each other. That is to say, one rotor magnet with the South pole on top and north pole on the bottom and the other rotor magnet with north pole on top and the south pole on the bottom.
Figure 26:
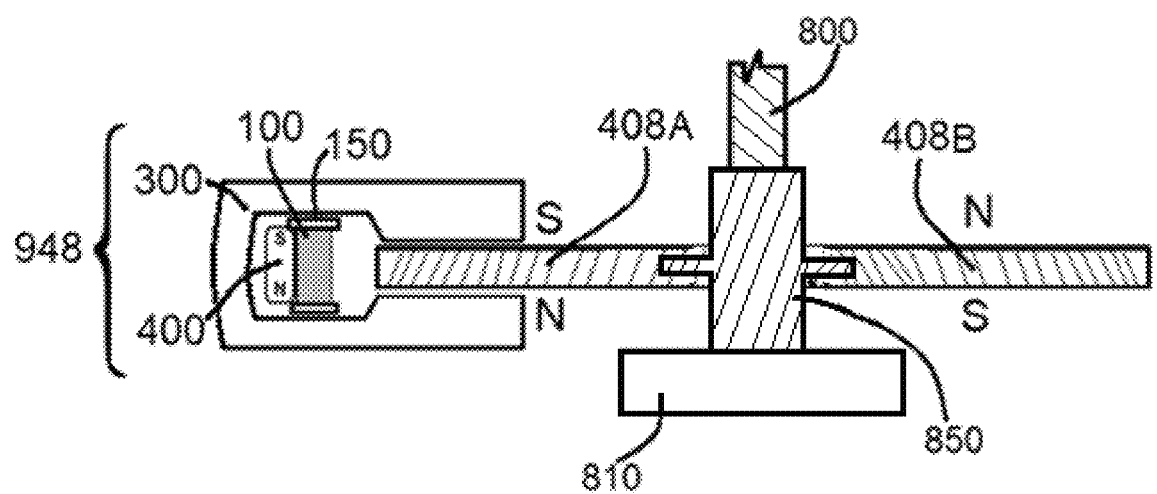
FIG. 26 illustrates an alternate configuration of this present invention showing a side view cut away, whereby there is one impulse unit containing a permanent magnet, along side a coil with an iron core or other permeable material, two flat half circle permanent magnets, axially magnetized, being oriented with opposite pole to each other, rotating through the impulse unit magnetic field conduit gap; being affixed horizontally to a rotor sitting on and attached to a rotor bearing, which is affixed to a shaft; whereby each of the two rotor magnets are oriented with opposite poles to each other. That is to say, one rotor magnet with the South pole on top and north pole on the bottom and the other rotor magnet with north pole on top and the south pole on the bottom.

Although the preferred embodiment requires a plurality of stator units 948 and a plurality of rotor magnets 410, as previously describe in this description, the invention in an alternate configuration as shown in FIG. 25 and FIG. 26 has one impulse unit 948 and two flat half circle permanent magnets 408A and 408B, axially magnetized; whereby each of the two rotor magnets 408A and 408B being oriented with opposite poles to each other, are affixed horizontally to a rotor 850 which is affixed to a shaft 800. The switches 117, 314, 316, 317, 318, 357 or 992 depending on the configuration with the commuter attached to the flywheel or with a separate commuter wheel; sends current to the impulse unit coil 100 when the rotor magnet 408A, having matching polarity to the energized impulse unit coil causing the rotor magnet 408A to be repulsed out of the impulse unit magnetic field conduit gap 500 in the one phase, while the rotor magnet on the opposite side 408B is attracted to the impulse unit magnetic field conduit gap 500 in the same phase.

In the next phase when the rotor magnet 408B enters the impulse unit magnetic field conduit gap 500 the switches 117, 314, 316, 317, 318, 357 or 992 depending on the configuration with the commuter attached to the flywheel or with a separate commuter wheel; sends no current to the impulse unit coil 100 when the rotor magnet 408B, having matching polarity to the impulse unit permanent magnet 400, causing the rotor magnet 408B to be repulsed out of the impulse unit magnetic field conduit gap 500, while the rotor magnet on the opposite side 408A is attracted to the impulse unit magnetic field conduit gap 500 in the same phase.

Figure 27:
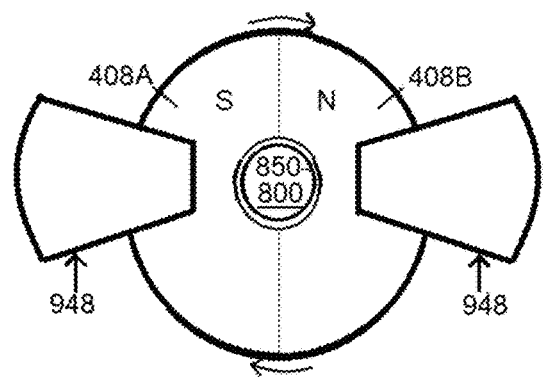
FIG. 27 illustrates an alternate configuration of this present invention showing a top view, whereby there is two impulse units, two flat half circle permanent magnets, axially magnetized, affixed horizontally to a rotor which is affixed to a shaft, with each of the two rotor magnets being oriented with opposite poles to each other; that is to say, one rotor magnet with the South pole on top and north pole on the bottom and the other rotor magnet with north pole on top and the south pole on the bottom.
Figure 28:
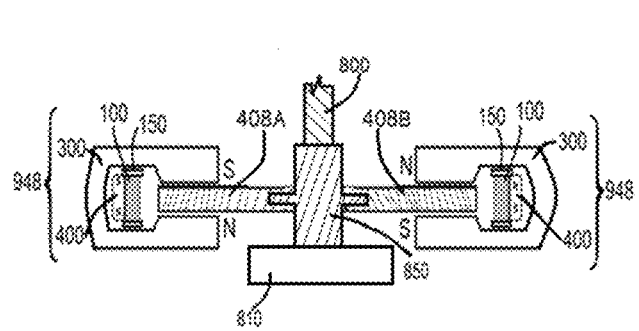
FIG. 28 illustrates an alternate configuration of this present invention showing a side view cut away, whereby there is more then one impulse unit containing a permanent magnet, along side a coil with an iron core or other permeable material, two flat half circle permanent magnets, axially magnetized, being oriented with opposite poles to each other rotating through the impulse unit magnetic field conduit gap; and affixed horizontally to a rotor sitting on and attached to a rotor bearing, which is affixed to a shaft, with each of the two rotor magnets being oriented with opposite poles to each other; that is to say, one rotor magnet with the South pole on top and north pole on the bottom and the other rotor magnet with north pole on top and the south pole on the bottom.

The invention in an alternate configuration as shown in FIG. 27 and FIG. 28 has two impulse unit 948 and two flat half circle permanent magnets 408A and 408B, axially magnetized and attached to a rotor; whereby each of the two rotor magnets 408A and 408B being oriented with opposite poles to each other, are affixed horizontally to a rotor 850 which is affixed to a shaft 800. The switches 117, 314, 316, 317, 318, 357 or 992 depending on the configuration with the commuter attached to the flywheel or with a separate commuter wheel; sends current to the impulse unit coil 100 when the rotor magnet 408A and 408B, having matching polarity to the energized impulse unit coil 100 causing the rotor magnet 408A and 408B to be repulsed out of the impulse unit magnetic field conduit gap 500 in the one phase, while the rotor magnet 408A or 408B on the opposite side is attracted to its opposite impulse unit magnetic field conduit gap 500 in the same phase.

In the next phase when the rotor magnet 408A and 408B enters the opposite impulse unit magnetic field conduit gap 500 the switches 117, 314, 316, 317, 318, 357 or 992 depending on the configuration with the commuter attached to the flywheel or with a separate commuter wheel; sends no current to the impulse unit coils 100. The rotor magnets 408A and 408B having matching polarity to the impulse unit permanent magnet 400 and thereby the impulse unit magnetic field conduit gap 500, causes the rotor magnet 408A and 408B to be repulsed out of the impulse unit magnetic field conduit gap 500, while the rotor magnet on the opposite side is attracted to its opposite impulse unit magnetic field conduit gap 500 in the same phase.

Figure 29:
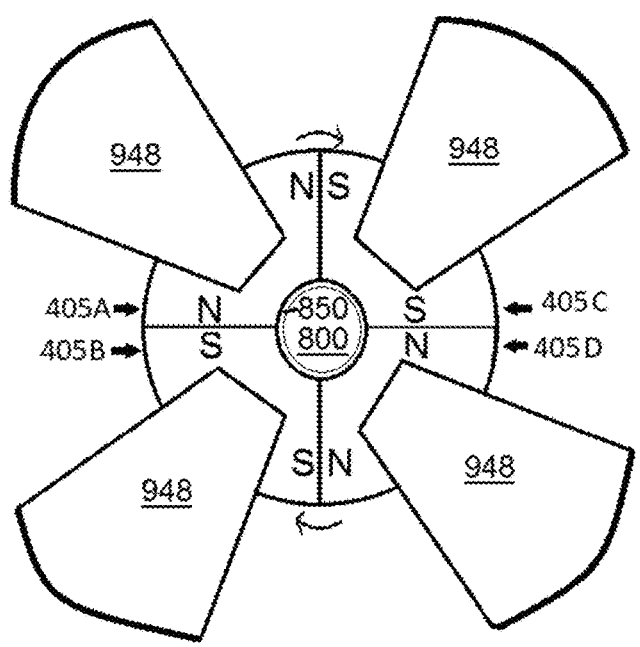
FIG. 29 illustrates an alternate configuration of this present invention showing a top view, whereby there is four impulse units, four flat quarter circle permanent magnets, axially magnetized, rotating through the impulse unit magnetic field conduit gap; and affixed horizontally to a rotor which is affixed to a shaft, with each of the two rotor magnets being oriented with opposite poles to each other; that is to say, one rotor magnet with the South pole on top and north pole on the bottom and the other rotor magnet with north pole on top and the south pole on the bottom.

The invention in an alternate configuration as shown in FIG. 29 has four impulse units 948 and four flat quarter circle permanent magnets 405A, 405B, 405C and 405D axially magnetized; whereby each of the four rotor magnets 405A, 405B, 405C and 405D being oriented with opposite poles to each other, are affixed horizontally to a rotor 850 which is affixed to a shaft 800. The switches 117, 314, 316, 317, 318, 357 or 992 depending on the configuration with the commuter attached to the flywheel or with a separate commuter wheel; sends current to the impulse unit coils 100 when the rotor magnet 405A, 405B, 405C and 405D, having matching polarity to the energized impulse unit coil and thereby having matching polarity in the impulse unit magnetic field conduit gap 500 causing the rotor magnets 405A, 405B, 405C and 405D to be repulsed out of the impulse unit magnetic field conduit gap 500 in the one phase, while the rotor magnets on the opposite side is attracted to its opposite impulse unit magnetic field conduit gap 500 in the same phase.

In the next phase when the rotor magnet 408A and 408B enters the opposite impulse unit magnetic field conduit gap 500 the switches 117, 314, 316, 317, 318, 357 or 992 depending on the configuration with the commuter attached to the flywheel or with a separate commuter wheel; sends no current to the impulse unit coil 100. The rotor magnets 405A, 405B, 405C and 405D having matching polarity to the impulse unit permanent magnet 400 and thereby the impulse unit magnetic field conduit gap 500, causes the rotor magnets 405A, 405B, 405C and 405D to be repulsed out of the impulse unit magnetic field conduit gap 500, while the rotor magnet on the opposite side is attracted to its opposite impulse unit magnetic field conduit gap 500 in the same phase.

The impulse unit magnetic field conduits have a plurality of alternate arrangements as shown in FIG. 42, 308, FIG. 43, 306 FIG. 44, 305, FIG. 45, 151 and FIG. 46, 151. As well as an alternate positioning of the impulse unit coils in relation to the impulse unit magnetic field conduits as shown in FIG. 65, 15, FIG. 66, 15, FIG. 67, 15, FIG. 68, 153A, 153B, FIG. 69, 153A,153B, and FIG. 70, 153A,153B. Although these alternate arrangements of impulse unit magnetic field conduits have different shapes, they operate the same way as the preferred embodiment.

Figure 47:
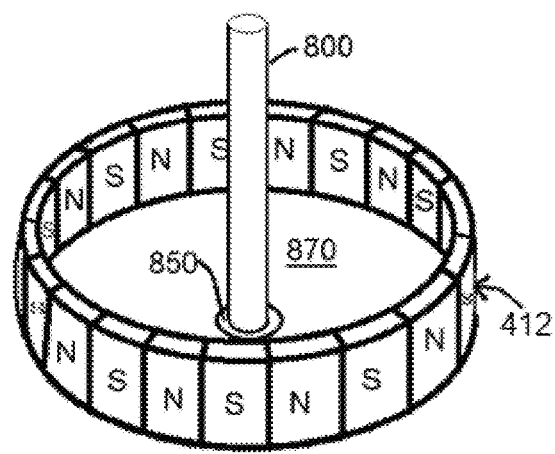
FIG. 47 illustrates an alternate configuration of this present invention showing a side angle view of the rotor, wheel and shaft with permanent magnets attached vertically to the outside rim of the wheel and held tight together, facing out and oriented with opposite polarity to each adjacent magnet.
Figure 48:
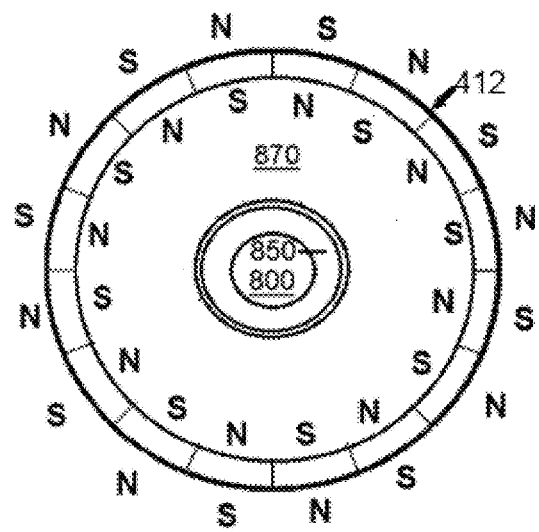
FIG. 48 illustrates an alternate configuration of this present invention showing a top view of the rotor, wheel and shaft with permanent magnets, vertically attached to the outside rim of the wheel and held tight together, facing out and oriented with opposite polarity to each of its adjacent magnet.

As shown in FIG. 47 and FIG. 48, the rotor magnets 412 in an alternate arrangement has permanent magnets 412 attached vertically to the outside rim of the rotor wheel 870 and set together, facing out and oriented with opposite polarity to each adjacent rotor magnet 412.

Figure 43:
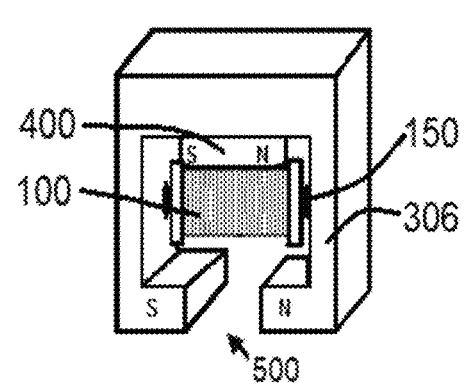
FIG. 43 illustrates an alternate configuration of this present invention showing an angled side view of the impulse unit which includes an alternative impulse unit magnetic field conduit which is square, made up of permeable material with a gap at one end and contained within it a coil with an iron or other permeable material core, and an adjacent permanent magnet of the present invention.
Figure 44:
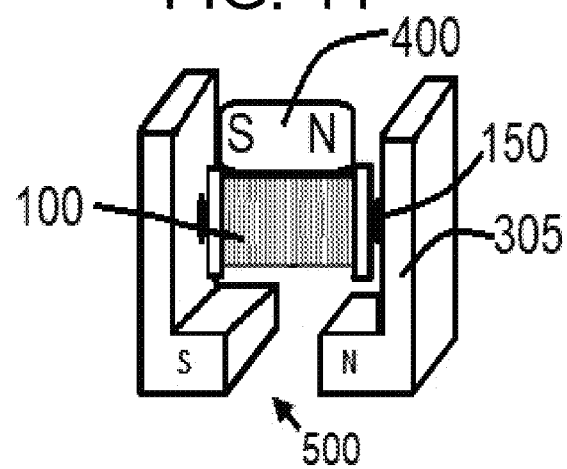
FIG. 44 illustrates an alternate configuration of this present invention showing an angled side view of the impulse unit which includes an alternative impulse unit magnetic field conduit which is square, opened at the top and at the bottom, made up of permeable material and contained within it a coil with an iron or other permeable material core, and an adjacent permanent magnet of the present invention.
Figure 45:
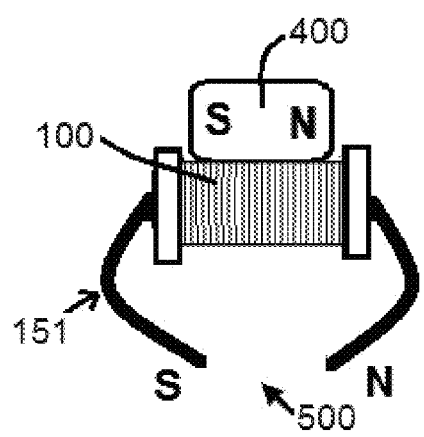
FIG. 45 illustrates an alternate configuration of this present invention showing a front view of a impulse unit which the impulse unit magnetic field conduit has arms which run through the core of the coil and circles around leaving a gap between the two arms, and whereby the arms are made up of permeable material. Also shown is the coil and an adjacent permanent cylinder magnet axially magnetized.
Figure 46:
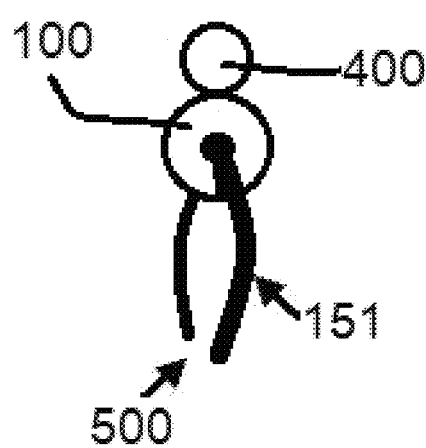
FIG. 46 illustrates an alternate configuration of this present invention showing a side view of a impulse unit which the impulse unit magnet field conduit has arms which run through the core of the coil and circles around leaving a gap between the two arms at the opposite end; and whereby the arms are made up of permeable material. Also shown is the coil and an adjacent permanent cylinder magnet, axially magnetized.
Figure 49:
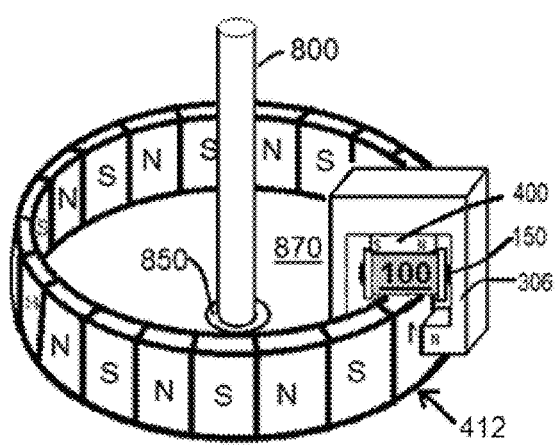
FIG. 49 illustrates an alternate configuration of this present invention showing a side angle view of the rotor, wheel and shaft with permanent magnets vertically attached to the outside rim of the wheel and held tight together, facing out and oriented with opposite polarity to each adjacent magnet; with a single impulse unit straddling the vertical rotor magnets.
Figure 50:
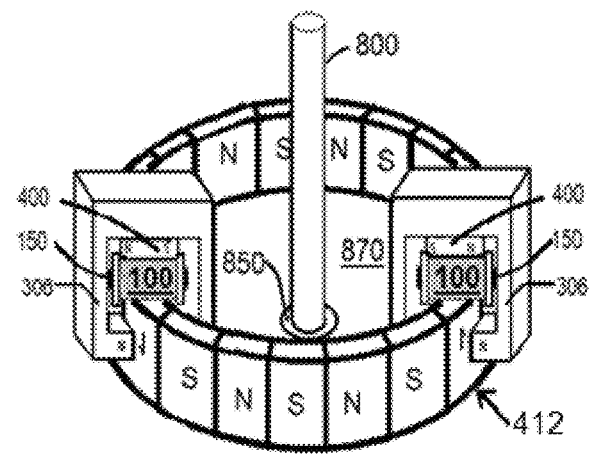
FIG. 50 illustrates an alternate configuration of this present invention showing a side angle view of the rotor, wheel and shaft with permanent magnets attached vertically to the outside rim of the wheel and held tight together, facing out and oriented with opposite polarity to each adjacent magnet; with a plurality of impulse units straddling the vertical rotor magnets.

In the case of at least one impulse unit as shown in the alternate arrangement FIG. 43, FIGS. 44, 45, and 46 the impulse unit permanent magnet 400, illustrated in FIG. 43, FIG. 49 and FIG. 50, with the Magnetic field conduit 15,151A and 151B, 305, 306, 308 with an impulse unit coil 100 and impulse unit permanent magnet 400 contained therein; straddles the vertical rotor magnets. In this arrangement, where a plurality of impulse units is used, their impulse unit coils 100 are wired in the same manor as the preferred embodiments; and whereby the impulse unit permanent magnets 400 are also oriented in the same way as the preferred embodiments. Further, the switching, timing and magnetic field orientations of the impulse unit coils 100 in relation to the adjacent impulse unit coils 100 and the impulse unit permanent magnets 400 are the same as in the preferred embodiments.

Figure 51:
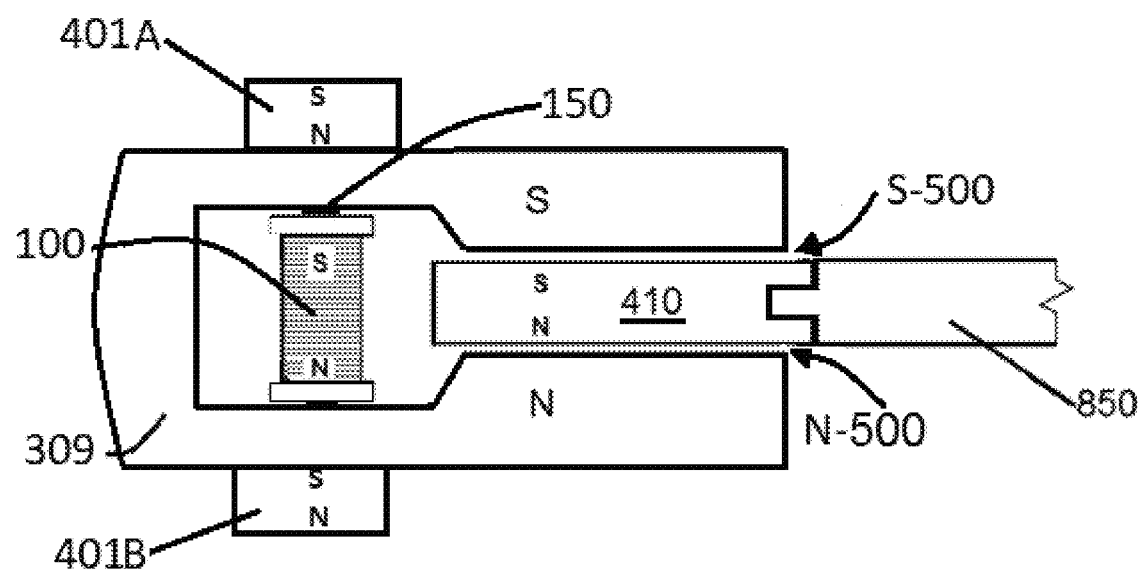
FIG. 51 illustrates an alternate configuration of this present invention showing a side view of the impulse unit, with two permanent magnets affixed the outside of the impulse unit magnetic field conduit, and oriented with its polarity being opposite to the other permanent magnet on the other side of the impulse unit magnetic field conduit; and with opposite polarity to the adjacent pole of the impulse unit coil when the said impulse unit coil is energized. Whereby the rotor magnet has a top polarity being south pole and bottom polarity being north pole, are in the impulse unit magnetic field conduit gap. The polarity of the top 50% of the impulse unit magnetic field conduit gap is south pole and 50% of the bottom said impulse unit magnetic field conduit gap is north pole; and which the rotor magnets are attached to the rotor.
Figure 52:
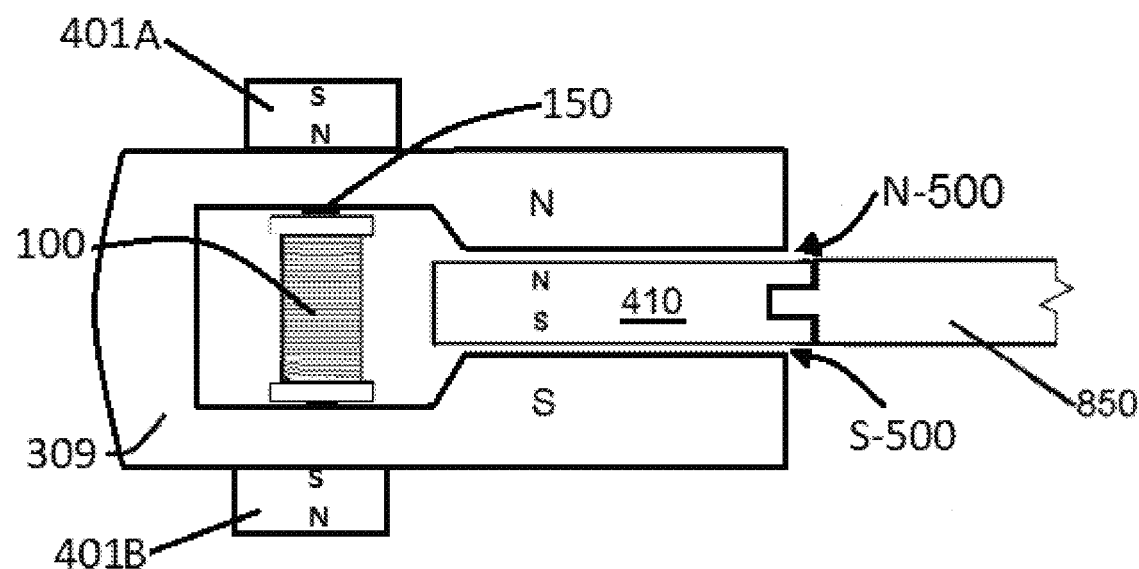
FIG. 52 illustrates an alternate configuration of this present invention showing a side view of the impulse unit, with two permanent magnets affixed the outside of the impulse unit magnetic field conduit, and oriented with its polarity being opposite to the other permanent magnet on the other side of the impulse unit magnetic field conduit and the impulse unit coil is not energized; whereby the rotor magnet has a top polarity being north pole and bottom polarity being south pole, are in the impulse unit magnetic field conduit gap. The polarity of the top 50% of the impulse unit magnetic field conduit gap is north pole and 50% of the bottom said impulse unit magnetic field conduit gap is south pole; and which the rotor magnets are attached to the rotor.

The impulse unit magnetic field conduit of the present invention in an alternate arrangement as shown in the FIG. 51 and FIG. 52 has two permanent magnets 401A, 401B affixed the outside rail of the magnetic field conduit 309, and the impulse unit permanent magnet 401A is oriented with its polarity being opposite to the other impulse unit permanent magnet 401B on the other side of the impulse unit magnetic field conduit 309; and with opposite polarity to the adjacent pole of the impulse unit coil 100 when the said impulse unit coil 100 is energized. Thereby, in FIG. 51 the rotor 850 is attached to the rotor magnet 410; wherein the rotor magnet 410 has a polarity being south pole on one side and north pole polarity on the other side, and aligned within the impulse unit magnetic field conduit gap 500. The impulse unit magnetic field conduit gap 500 has a south pole polarity S-500 of one side and north pole polarity N-500 on the other side; whereby the polarity of the two sides of the impulse unit magnetic field conduit gap 500 is facing like poles on the rotor magnets 410.

As shown in FIG. 52 the impulse unit external permanent magnet 401A is oriented with its polarity being opposite to the other impulse unit external permanent magnet 401B on the other side of the impulse unit magnetic field conduit 309. The impulse unit coil 100 is not energized. The rotor 850 is attached to the rotor magnet 410; which has one side polarity being north pole and the other side polarity being south pole; and being in the impulse unit magnetic field conduit gap 500. The impulse unit magnetic field conduit gap 500 has a north pole polarity N-500 on one side and south pole polarity S-500 on the other side facing the like poles of the rotor magnets 410.

The switching, timing and magnetic field orientations of the coils in relation to the adjacent impulse unit coils 100 and the impulse unit permanent magnets 400 are the same as in the preferred embodiments, as are the impulse unit permanent magnets polarity orientation in relation to the adjacent impulse unit permanent magnets polarity orientations, that being opposite.

Figure 7:
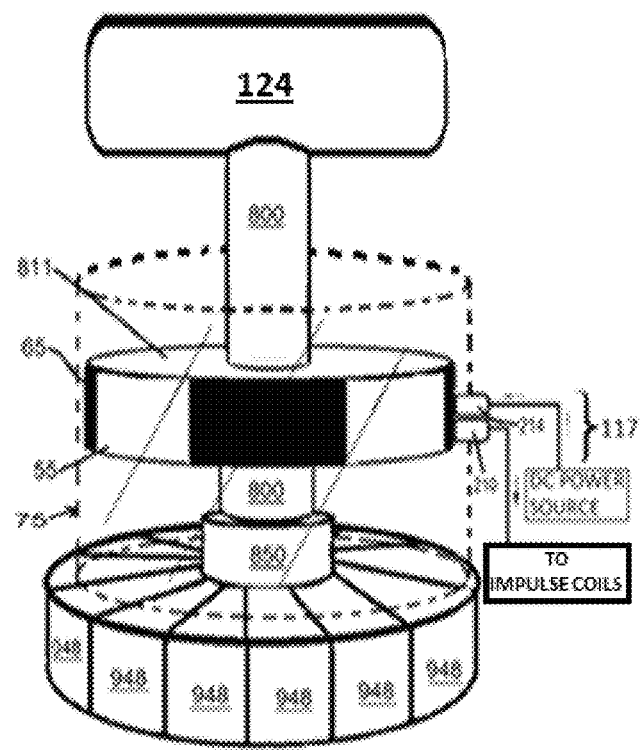
FIG. 7 illustrates the preferred configuration of this present invention showing a side angle view of a plurality impulse units making up the base. Also shown is the shaft, rotor, flywheel, commuter comprised of copper contacts and non-conducting material contacts, to act as a commuter and a set of two brushes supported by a structure within the present invention; whereby the present invention is supplied by a DC power source through one brush to the other. On top of the shaft is a device which represents any device which uses the mechanical energy of the present invention to function.

As shown in FIG. 7, attached to the shaft 800 is a device 124 which represents any device or machine that uses the mechanical energy of the present invention to function. Also shown is the rotor 850, flywheel 811 which is acting as a commuter with affixed at least one copper contact 55 and non-conducting material contact 65; whereby the two brushes are supported by any structure 75. The brushes 210, 214 are supplied by a DC power source through one brush 214 to another 210, which coupled together comprises the rotary switch 117.

Figure 8:
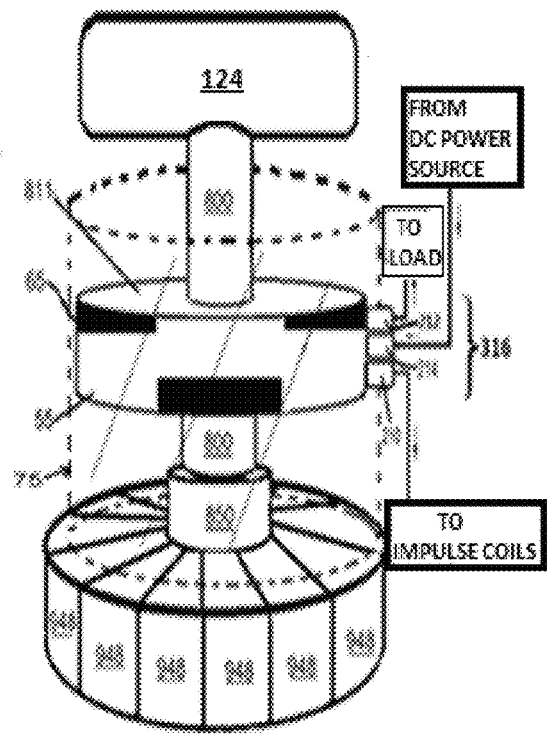
FIG. 8 illustrates an alternate arrangement of this present invention showing a side angle view of a plurality impulse units making up the base. Also shown is the shaft, rotor, flywheel and commuter comprised of copper contacts and non-conducting material contacts, to act as a commuter and a set of three brushes supported by a transparent plastic tube within the present invention; whereby the present invention is supplied by a DC power source through one brush to another. On top of the shaft is a device which represents any device which uses the mechanical energy of the present invention to function.

As shown in FIG. 8, attached to the shaft 800 is a device 124 which represents any device or machine that uses the mechanical energy of the present invention to function. Also shown is the shaft 800, rotor 850, flywheel wheel 811 which is acting as a commuter with affixed at least one copper contact 55 and non-conducting material contact 65; whereby the three brushes 210, 212 and 214 are supported by a structure 75. The brushes 210, 212 and 214 are supplied by a DC power source through one brush 214 to another brush 210 or 212, sending the current to the impulse unit coils 100 in one phase via way of brush 210 and to a load or loads in another phase via way of brush 212, which coupled together comprises the rotary switch 316.

Figure 53:
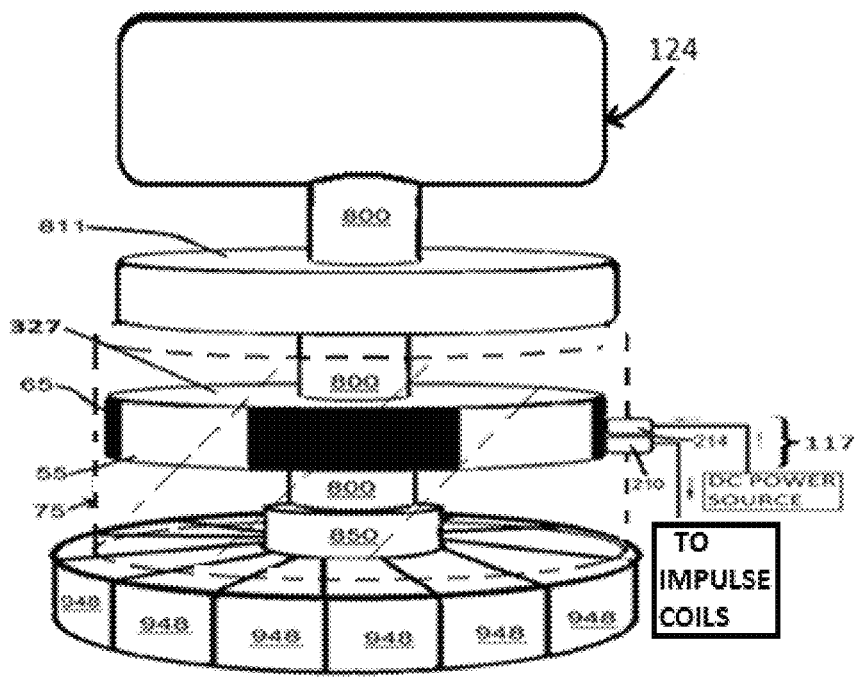
FIG. 53 illustrates the preferred configuration of this present invention showing a side angle view of a plurality impulse units making up the base. Also shown is the shaft, rotor, flywheel and commuter wheel with the copper contacts and non-conducting material contacts. Also featured a set of two brushes supported by a structure; whereby the present invention is supplied by a DC power source through one brush to the other. On top of the shaft is a device which represents any device that uses the mechanical energy of the present invention to function.

As shown in FIG. 53, attached to the shaft is a device 124 which represents any device or machine that uses the mechanical energy of the present invention to function. Also shown is the shaft 800, rotor 850, flywheel 811, commuter wheel 327 which has copper contacts 55 and non-conducting material contacts 65 affixed to it; whereby the two brushes 210 and 214 are supported by a structure 75. The brushes 210, 214 are supplied by a DC power source through one brush 214 to another brush 210, wherein brush 210 supplies current to at least one impulse unit coil 100 as part of the impulse unit 948.

Figure 54:
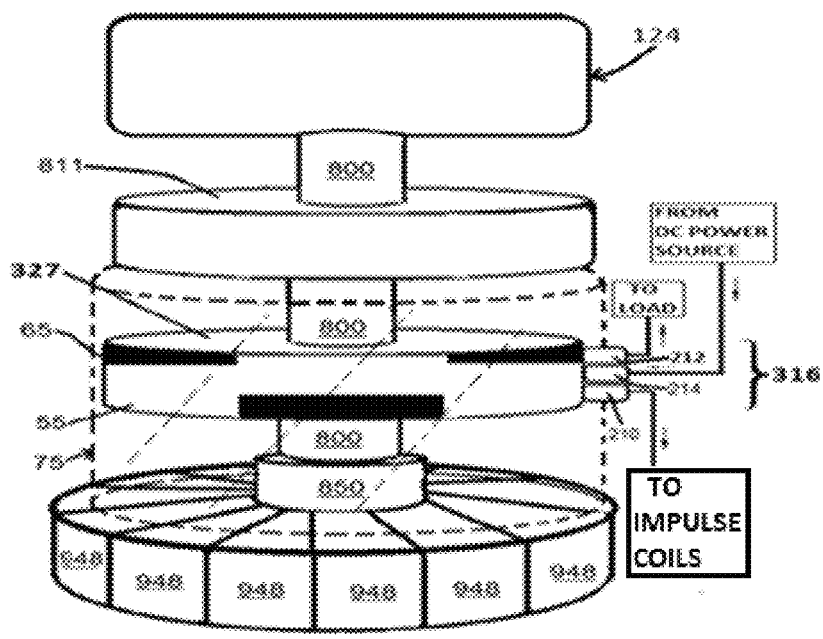
FIG. 54 illustrates an alternate arrangement of this present invention showing a side angle view of a plurality of impulse units making up the base. Also shown is the shaft, rotor, and commuter wheel with the copper contacts and non-conducting material contacts. Also featured a set of two brushes supported by a structure; whereby the present invention is supplied by a DC power source through one brush to the other. On top of the shaft is a device which represents any device that uses the mechanical energy of the present invention to function.

As shown FIG. 54, a plurality of impulse units 948; wherein attached to the shaft 800 is a device 124 which represents any device or machine that uses the mechanical energy of the present invention to function. Also shown is the rotor 850, flywheel 811 and commuter wheel 327 which has at least one copper contact 55 and at least one non-conducting material contact 65 affixed to it; whereby the three brushes 210, 212, 214 are supported by a structure 75. The brushes 210, 212, and 214 are supplied by a DC power source through one brush 214 to another 210 or 212, sending the current to the impulse unit coils 100 in one phase through brush 210 and to a load or loads in another phase through brush 212.

Figure 55:
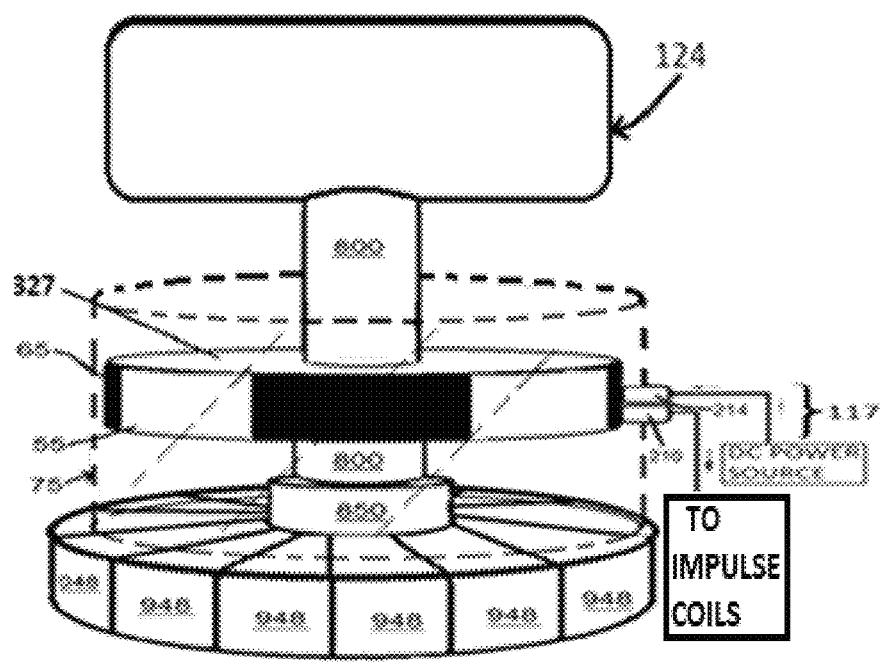
FIG. 55 illustrates an alternate arrangement of this present invention showing a side angle view of a plurality of impulse units making up the base. Also shown is the shaft, rotor, commuter which has copper contacts and non-conducting material contacts. Also featured a set of two brushes supported by a structure; whereby the present invention is supplied by a DC power source through one brush to another. On top of the shaft is a device which represents any device that uses the mechanical energy of the present invention to function.

As shown in FIG. 55 of the alternate arrangement; whereby the present invention can operate without a fly wheel if surge of rotation is not a concern. The commuter wheel 327 here is not acting as a flywheel and supplies only limited inertia. Also shown is the shaft 800, rotor 850, the commuter wheel 327 which has at least one copper contact 55 and at least one non-conducting material contact 65; whereby the two brushes 210 and 214 are supported by a structure 75. The brushes 210 and 214 are supplied current by a DC power source through one brush 214 to another brush 210. A plurality of impulse units 948; wherein attached to the shaft 800 is a device 124 which represents any device or machine that uses the mechanical energy of the present invention to function.

Figure 56:
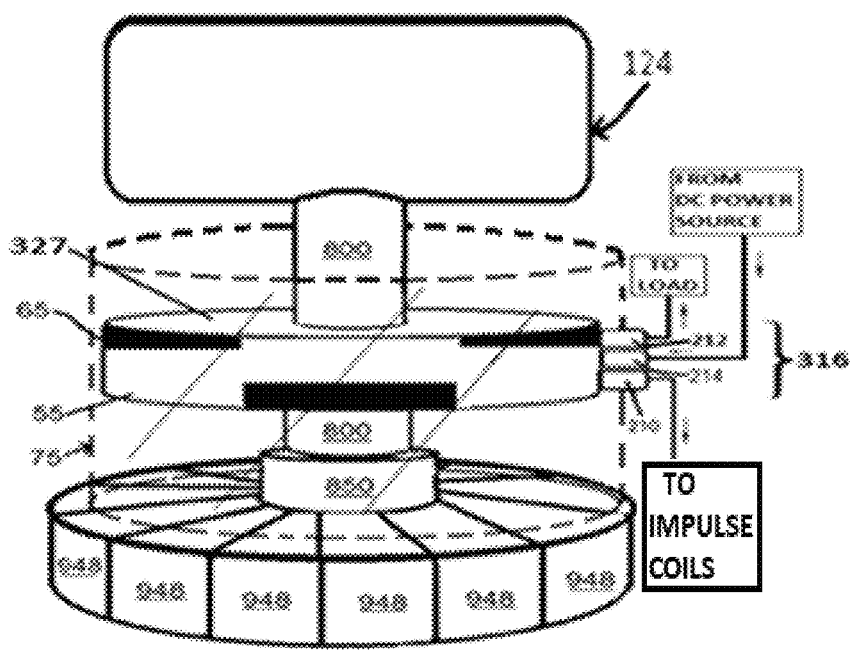
FIG. 56 illustrates an alternate arrangement of this present invention showing a side angle view of a plurality of impulse units making up the base. Also shown is the shaft, rotor, and commuter which has copper contacts and non-conducting material contacts. Also featured a set of three brushes supported by a structure; whereby the present invention is supplied by a DC power source through one brush to another. On top of the shaft is a device which represents any device that uses the mechanical energy of the present invention to function.
Figure 57:
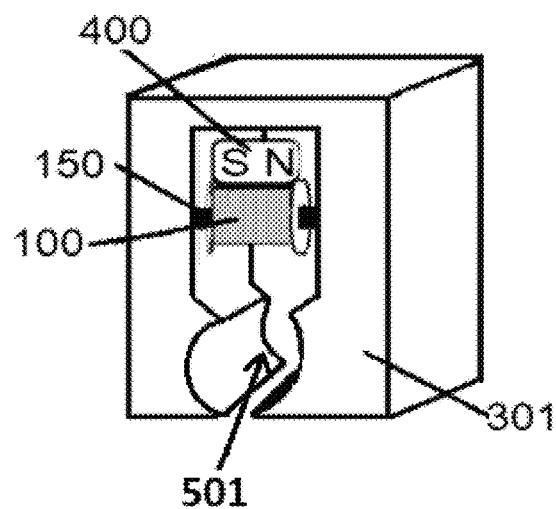
FIG. 57 illustrates an alternate arrangement of this present invention showing a side angle view of the impulse unit which includes the magnetic field conduit made up of permeable material with a round shaped gap at one end and having a coil with an iron or other permeable material core, and a magnet.

As shown in FIG. 56 of the alternate arrangement; whereby the present invention can operate without a fly wheel if surge of rotation is not a concern. The commuter wheel 327 here is not acting as a flywheel and supplies only limited inertia. Also shown is the shaft 800, rotor 850, the commuter wheel 327 which has at least one copper contact 55 and at least one non-conducting material contact 65 whereby the three brushes 210, 212, and 214 are supported by a structure 75. The brushes 210, 212, and 214 are supplied by a DC power source through one brush 214 to another 210 or 212, sending the current to the impulse unit coils 100 in one phase via way of the brush 210 and to a load or loads in another phase via way of brush 212. A plurality of impulse units 948; wherein attached to the shaft is a device 124 which represents any device or machine that uses the mechanical energy of the present invention to function.

Figure 58A:
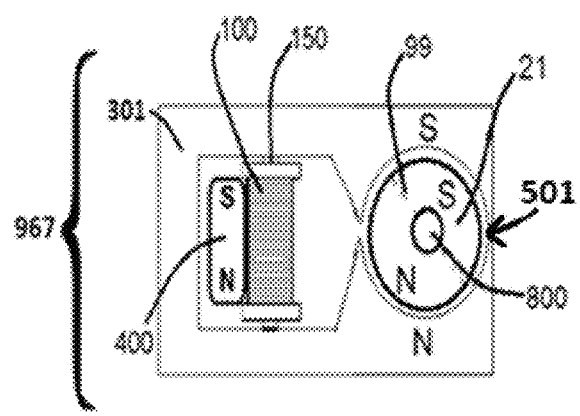
FIG. 58A illustrates an alternate arrangement of this present invention showing a side view of the impulse unit comprising a coil with an iron or other permeable material core, a permanent magnet, the magnetic field conduit comprised of permeable material with a round gap at one end; and a cylinder magnet diametrically magnetized with a shaft through its center and positioned in the said magnetic field conduit round gap. The poles of the magnet are indicated for polarity; whereby it shows the magnetic field relationship with the impulse unit magnetic field conduit at the round gap.
Figure 58B:
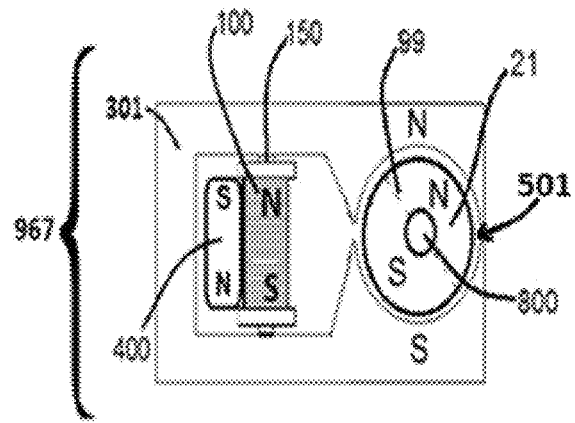
FIG. 58B illustrates an alternate arrangement of this present invention showing a side view of the stator unit, comprising a coil with an iron or other permeable material core, an magnet, the magnetic field conduit comprised of permeable material with a round gap at one end; and a cylinder magnet diametrically magnetized with a shaft through its center and positioned in the said magnetic field conduit round gap. The poles of the magnet are indicated for polarity and the coils are illustrated as energized, showing the poles of the coils polarity; whereby it shows the magnetic field relationship of the two competing fields with the resulting magnetic field in the impulse unit magnetic field conduit at the round gap.
Figure 59:
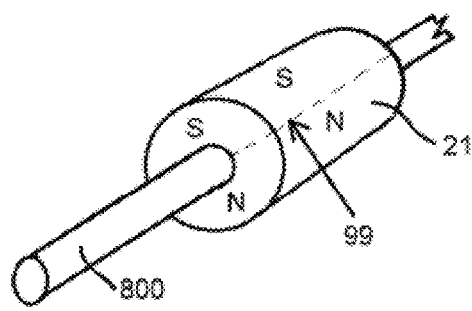
FIG. 59 illustrates an alternate arrangement of this present invention showing a cylinder magnet which is diametrically magnetised with a shaft running the length, through the middle of the cylinder magnetic.
Figure 61:
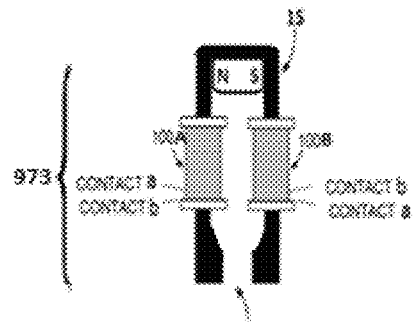
FIG. 61 illustrates an alternate arrangement of this present invention showing a front view of the impulse unit which includes an alternative magnetic field conduit made up of permeable material with a gap at one end and coupled with two impulse unit coils with an iron or other permeable material core and having two contacts for current input and output; wherein the said impulse unit coils are oriented vertically in relation to the impulse unit permanent magnet.

The impulse unit 967 with an alternate impulse unit magnetic field conduit 301 arrangement as shown in FIG. 57, FIG. 58A, FIG. 58B and FIG. 6; wherein the impulse unit magnet field conduit 301 forms a round gap 501 at one end of the impulse unit magnetic field conduit structure, allowing for a cylinder permanent magnet 21, which is diametrically magnetized 99 to be in the said impulse unit magnetic field conduit gap 501 of the impulse unit magnetic field conduit 301; wherein being attached to a shaft 800 which runs through the length and centre of the cylinder permanent magnet 21 as shown in FIG. 59. The shaft 800 is coupled to bearings 205 as shown in FIG. 60.

Figure 60:
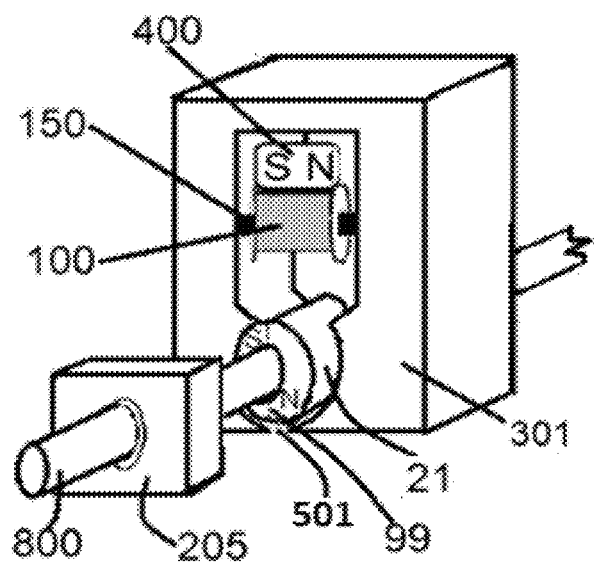
FIG. 60 illustrates an alternate arrangement of this present invention showing a side angle view of the impulse unit comprising a coil with an iron or other permeable material core, a magnet, the impulse unit magnetic field conduit comprised of permeable material with a round gap at one end; and a cylinder magnet diametrically magnetized with a shaft through its center and positioned in the said impulse unit magnetic field conduit round gap, whereby the shaft is attached to the bearing.

In this alternate arrangement as shown in FIG. 60 the cylinder permanent magnet 21 rotates in the impulse unit magnetic field conduit gap 501 of the impulse unit magnetic field conduit 301. This is due to the changing polarity of the magnetic fields in the impulse unit magnetic field conduit gap 501, which is caused by turning the impulse unit coils 100 on and off with synchronised timing, as explained in detail earlier in this description. The unique embodiments of the present invention use the natural properties of the impulse unit permanent magnet 400 and that of the cylinder permanent magnet 210 to cause a repulsion and attraction while the impulse unit coil 100 is off.

As described earlier, when the impulse unit coil 100 is on, the impulse unit coils 100 magnetic field absorbs the impulse unit permanent magnets 400 magnetic field and flips the polarity in the impulse unit magnetic field conduit gap 501; wherein the said impulse unit coils 100 magnetic field takes precedence in the magnetic field conduit gap 501. This interaction is illustrated in FIG. 58A where the impulse unit coil 100 is not energized and the impulse unit permanent magnet 400 magnetic field polarity takes precedence at the magnetic field conduit gap 501.

This interaction is further illustrated in FIG. 58B. The poles of the impulse unit permanent magnet 400 are indicated N for north pole polarity and S for south pole polarity. The impulse unit coils 100 are illustrated as energized, showing the pole N for north pole polarity and S for south pole polarity of the impulse unit coils 100; whereby it shows the magnetic field relationship of the two competing fields, that being the impulse unit permanent magnet 400 and the stator coil 100 with the resulting magnetic field at the impulse unit magnetic field conduit round gap 501.

Rotation of the permeant magnet 21 and shaft 800 in this alternate arrangement occurs as the rotors cylinder permanent magnet 21, being diametrically magnetized; wherein the magnetic polarity of the two sides of the rotor cylinder permanent magnet 21 and the magnetic polarity of the two sides of the impulse unit magnetic field conduit gap 501 is the same causing the rotor cylinder permanent magnet 21 to rotate away from the 'like' magnetic field due to repulsion. Further to this repulsion, there is attraction acting on the opposite side of the rotor cylinder permanent magnet 21 at the same time. This is due to the opposite side of the impulse unit magnetic field conduit gap 501 which magnetic polarity is opposite to the opposite side of the rotor cylinder permanent magnet 21.

The switch, which is well explained previous in this description and shown in a plurality of arrangements FIG. 20, FIG. 21, FIG. 22 FIG. 23 and FIG. 24; wherein reverses the polarity of the magnetic field in the impulse unit magnetic field conduit gap 501 by turning on and off the current to the impulse unit coil 100 in a synchronised manor, which insures the polarity of the two sides of the impulse unit magnetic field conduit gap 501 have the same polarity as the two sides of the permanent magnet 21; each time the rotor permanent magnet 21 makes a half rotation.

In an alternate arrangement the impulse unit 973 and impulse unit 982 as shown in FIG. 61, FIG. 62, FIG. 65, FIG. 66, FIG. 67, FIG. 68, FIG. 69, and FIG. 70, comprises of two impulse unit coils 100A, 100B with the impulse unit magnetic field conduit in FIG. 61, 15 and FIG. 62, 153A, 153B acting as both the impulse unit coil core and the impulse unit magnetic field conduit. The impulse unit magnetic field conduit is comprised of permeable material, with the impulse unit magnetic field conduit 15 having at least one impulse unit magnetic field conduit gap 500 at one end; wherein the said impulse unit coils 100A, 100B are oriented vertically in relation to the impulse unit permanent magnet 400, and where the impulse unit permanent magnet 400 is positioned between the two vertical rails of the impulse unit magnetic field conduits.

Figure 68:
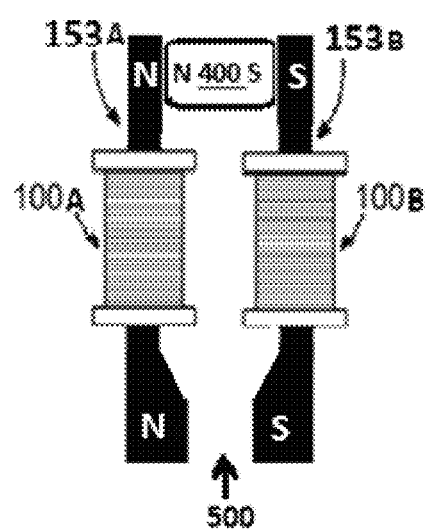
FIG. 68 illustrates an alternate arrangement of this present invention showing a front view of the impulse unit which includes an alternative magnetic field conduit made up of permeable material with a gap at both ends and coupled with two impulse unit coils with an iron or other permeable material core; wherein the said impulse unit coils are oriented vertically in relation to the impulse unit permanent magnet; whereby it shows the magnetic field relationship with the impulse unit magnetic field conduit at the gap.

In FIG. 61,15 FIG. 65,15, FIG. 66,15 and FIG. 67,15 the impulse unit magnetic field conduit 15 is one complete structure and has a gap at one end. The impulse unit magnetic field conduit in FIG. 68, FIG. 69, FIG. 70 are comprised of two impulse unit magnetic field conduits 153A and 153B and are not joined.

Figure 66:
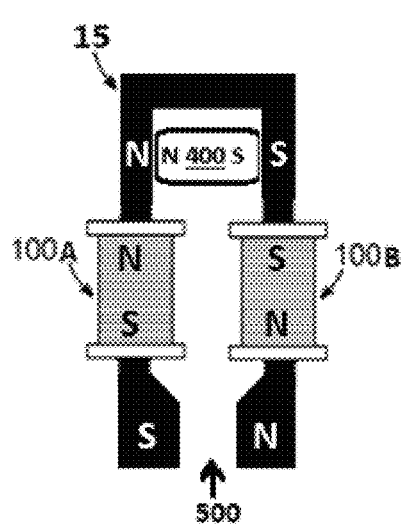
FIG. 66 illustrates an alternate arrangement of this present invention showing a front view of the impulse unit which includes an alternative magnetic field conduit made up of permeable material with a gap at one end and coupled with two impulse unit coils with an iron or other permeable material core; wherein the said impulse unit coils are oriented vertically in relation to the impulse unit permanent magnet. The poles of the impulse unit permanent magnet are indicated for polarity and the impulse unit coils are illustrated as energized, showing the poles of the impulse unit coils polarity; whereby it shows the magnetic field relationship of the two competing fields with the resulting magnetic field in the impulse unit magnetic field conduit at the gap.
Figure 67:
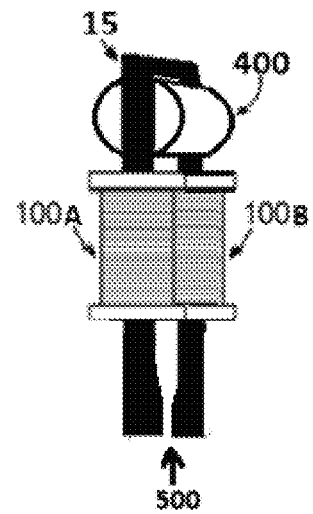
FIG. 67 illustrates an alternate arrangement of this present invention showing a front angled view of the impulse unit which includes an alternative magnetic field conduit made up of permeable material with a gap at one end and coupled with two impulse unit coils with an iron or other permeable material core; wherein the said impulse unit coils are oriented vertically in relation to the impulse unit permanent magnet.
Figure 69:
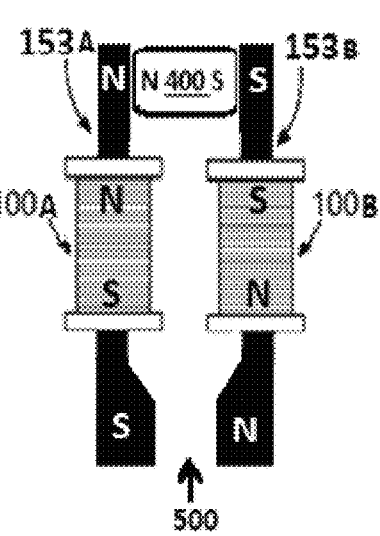
FIG. 69 illustrates an alternate arrangement of this present invention showing a front view of the impulse unit which includes an alternative magnetic field conduit made up of permeable material with a gap at both ends and coupled with two impulse unit coils with an iron or other permeable material core; wherein the said impulse unit coils are oriented vertically in relation to the impulse unit permanent magnet. The poles of the impulse unit permanent magnet are indicated for polarity and the impulse unit coils are illustrated as energized, showing the poles of the impulse unit coils polarity; whereby it shows the magnetic field relationship of the two competing fields with the resulting magnetic field in the impulse unit magnetic field conduit at the gap.
Figure 70:
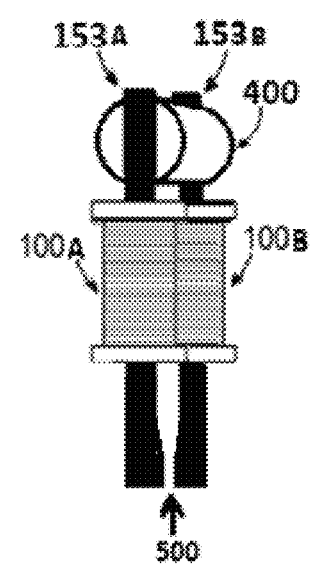
FIG. 70 illustrates an alternate arrangement of this present invention showing a front angled view of the impulse unit which includes an alternative magnetic field conduit made up of permeable material with a gap at both ends and coupled with two impulse unit coils with an iron or other permeable material core; wherein the said impulse unit coils are oriented vertically in relation to the impulse unit permanent magnet.
Figure 71:
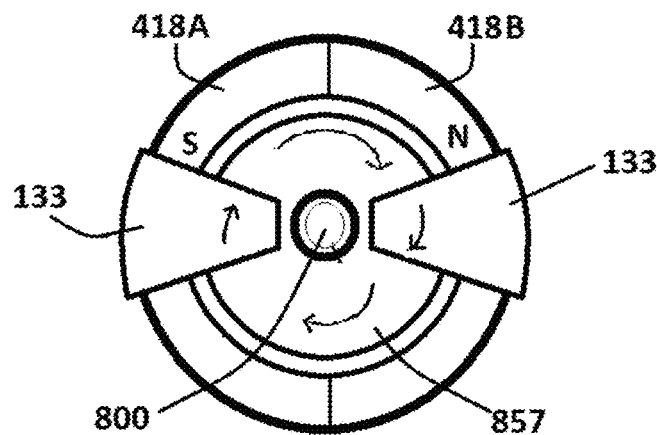
FIG. 71 illustrates an alternate arrangement of this present invention showing a top view of two impulse units affixed to the rotor, which said rotor is attached to the shaft; wherein a ring of two permanent magnets, oriented with opposite polarity to the adjacent permanent magnet, set stationary around the rotor and positioned in the impulse unit's magnetic field conduit gap; wherein the impulse unit being affixed to the rotor spins.
Figure 72:
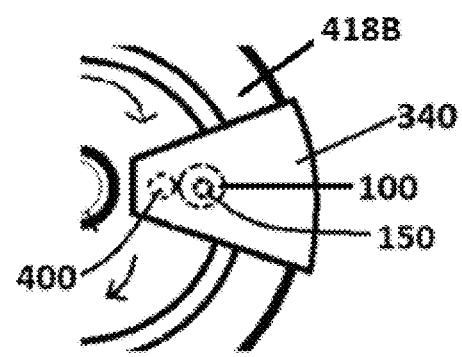
FIG. 72 illustrates an alternate arrangement of this present invention showing a top view close up of FIG. 71 which reveals the impulse unit affixed to the rotor; wherein the impulse unit comprises a permanent magnet represented by the small doted line circle, alongside a coil represented by a larger doted line circle, with a iron or other permeable material core, a magnetic field conduit straddling a stationary permanent magnet; wherein the impulse unit being affixed to the rotor spins.
Figure 73:
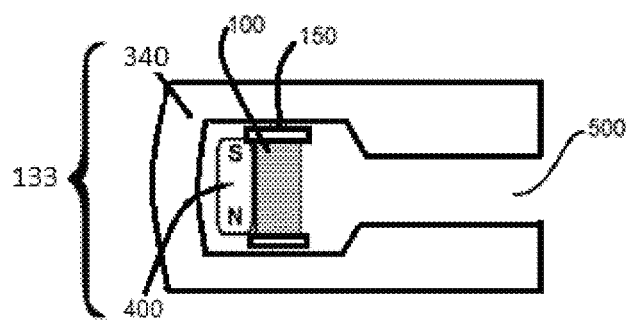
FIG. 73 illustrates an alternate arrangement of this present invention showing a side view of the impulse unit; wherein the impulse unit comprises a permanent magnet, alongside a coil, with an iron or other permeable material core, and magnetic field conduit made of permeable material.
Figure 74:
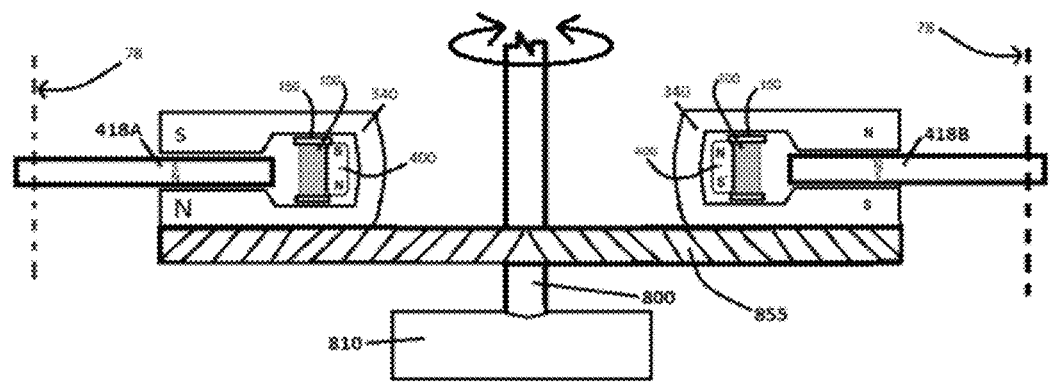
FIG. 74 illustrates an alternate arrangement of this present invention showing a side cut away view of two impulse units affixed to the rotor, which said rotor is attached to the shaft whereby the said shaft is affixed to a bearing; wherein a ring of permanent magnets, oriented with opposite polarity to the adjacent permanent magnet, set stationary by a supporting structure, around the rotor and positioned in the impulse unit's magnetic field conduit gap; wherein the impulse unit being affixed to the rotor spins.

As shown in FIG. 66 and FIG. 69 the impulse unit permanent magnet 400 is oriented whereby the magnetic polarity of the poles of the impulse unit permanent magnet 400 matches the adjacent poles of the impulse unit coils 100A and 100B, when the said impulse unit coils 100A, and 100B are energized. This results in the magnetic field of the impulse unit permanent magnet 400 being compressed; wherein the magnetic field polarity of the impulse unit coils 100A and 100B takes precedence in the impulse unit magnetic field conduit gap 500. When the impulse coils 100A and 100B are not energized the magnetic polarity of the impulse unit permanent magnet 400 takes precedence in the impulse unit magnetic field conduit gap 500 being opposite in magnetic polarity to that of the impulse unit coils 100A and 100B when said impulse unit coils 100A and 100B are energized.

Figure 63:
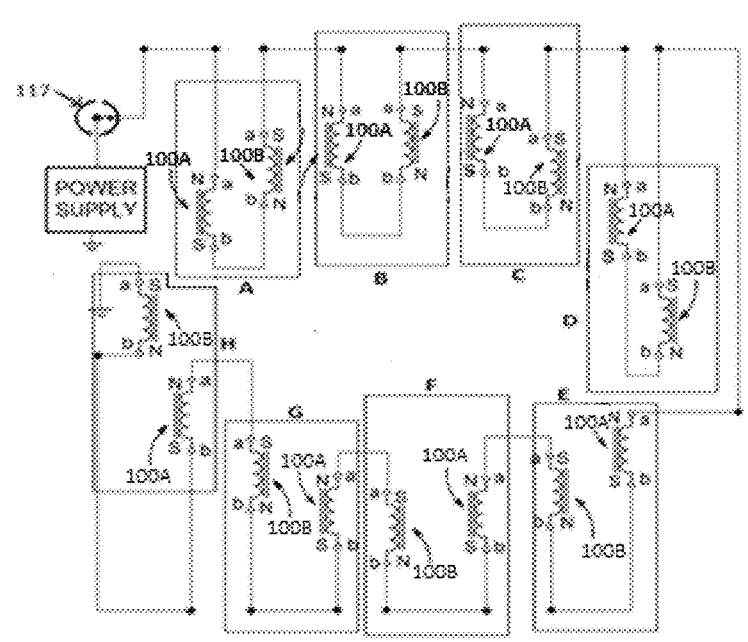
FIG. 63 illustrates an alternate arrangement of this present invention showing a diagram of the electric circuit which current is supplied by a DC power source through the rotary switch; wherein the impulse units are combined into sets of two in one impulse unit marked A to H; whereby wired in series to the impulse unit coils from the rotary switch in one phase and through the said rotary switch to an open circuit in the next phase. The alternate wiring is indicated by contact 'a' and contact 'b'; whereby, DC current goes into one impulse unit coil through the 'a' contact and out the 'b' contact, and into the next impulse unit coil through the 'b' contact and out the 'a' contact to cause the polarity of each impulse unit coil to be opposite its adjacent impulse unit coil, within the same impulse unit and opposite as well the impulse unit coil in the adjacent impulse unit.
Figure 62:
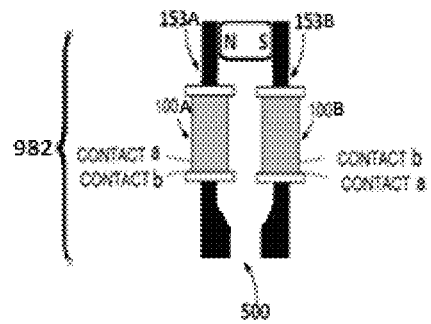
FIG. 62 illustrates an alternate arrangement of this present invention showing a front view of the impulse unit which includes an alternative magnetic field conduit made up of permeable material with a gap at both ends and coupled with two impulse unit coils with an iron or other permeable material core and having two contacts for current input and output; wherein the said impulse unit coils are oriented vertically in relation to the impulse unit permanent magnet.

In FIG. 63, each letter A, B, C, D, E, F, G, and H, represents two coils 100A and 100B in each impulse unit 973. As illustrated in FIG. 63, the impulse unit coils 100A and 100B are wired in series from the switch 117. As demonstrated in FIG. 63 wiring diagram, the impulse unit coils 100A, 100B are wired opposite to their adjacent impulse unit coils 100A, 100B, which includes those coupled in the same impulse unit 973, that is impulse unit coil 100A is wired opposite to impulse unit coil 100B in all cases where there is a plurality of impulse units.

Figure 64:
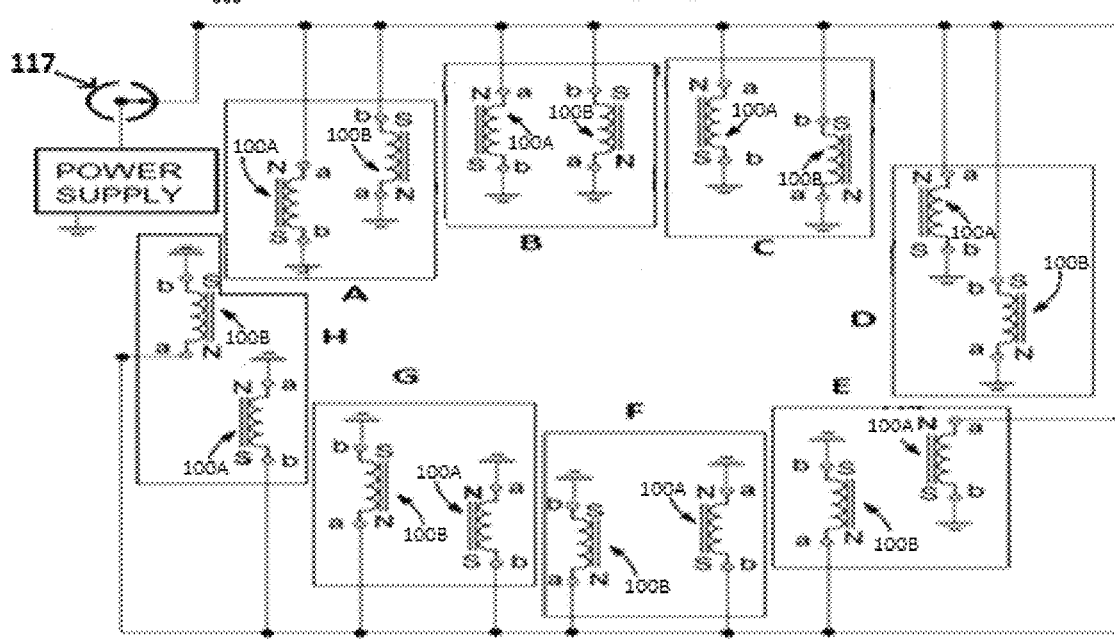
FIG. 64 illustrates an alternate arrangement of this present invention showing a diagram of the electric circuit which current is supplied by a DC power source through the rotary switch; wherein the impulse unit coils are combined into sets of two in one impulse unit marked A-H; wired in parallel to the impulse unit coils in one phase and through the said rotary switch to an open circuit in the next phase. The alternate wiring is indicated by contact 'a' and contact 'b', whereby DC current goes into one impulse unit coil through the 'a' contact and out the 'b' contact, and at the same time being in parallel, enters the adjacent impulse unit coil through the 'b' contact and out the 'a' contact, to cause the polarity of each impulse unit coil to be opposite its adjacent impulse unit coils within the same impulse unit and opposite as well the impulse unit coil in the adjacent impulse unit.
Figure 65:
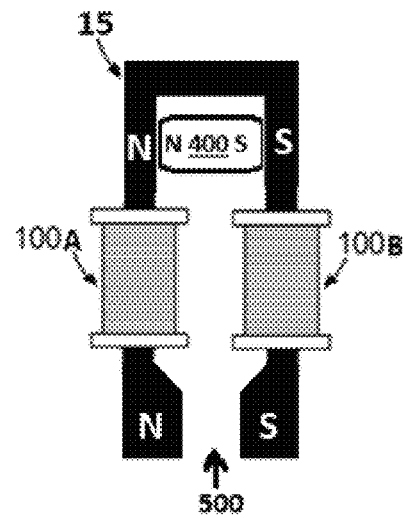
FIG. 65 illustrates an alternate arrangement of this present invention showing a front view of the impulse unit which includes an alternative magnetic field conduit made up of permeable material with a gap at one end and coupled with two impulse unit coils with an iron or other permeable material core; wherein the said impulse unit coils are oriented vertically in relation to the impulse unit permanent magnet. The poles of the impulse unit permanent magnet are indicated for polarity; whereby it shows the magnetic field relationship with the impulse unit magnetic field conduit at the magnetic field conduit gap.

In FIG. 64, each letter A, B, C, D, E, F, G, and H, represents two impulse unit coils 100A and 100B in each impulse unit 982. As illustrated in FIG. 64, the impulse unit coils 100A and 100B are wired in parallel from the switch 117. As demonstrated in FIG. 64 wiring diagram, the impulse unit coils 100A, 100B are wired opposite to their adjacent impulse unit coils 100A, 100B, which includes those coupled in the same impulse unit 973, that is impulse unit coil 100A is wired opposite to impulse unit coil 100B in all cases where there is a plurality of impulse units.

The opposite wiring in FIG. 63 and FIG. 64 is indicated by contact 'a' and contact 'b'; whereby, DC current goes into one impulse unit coil 100A or 100B through the 'a' contact and out the 'b' contact, and into the next impulse unit coil 100A or 100B through the 'b' contact and out the 'a' contact to cause the polarity of each impulse unit coil 100A, 100B to be opposite its adjacent impulse unit coil 100A, 100B at the same time.

In an alternative arrangement and what is essentially a reversed arrangement as shown in FIG. 71, FIG. 72, FIG. 73 and FIG. 74; at least one impulse unit 133 comprising a coil 100, a permanent magnet 400 and alternative magnetic field conduit 340 affixed to the rotor 857 and a ring of fixed permanent magnets 418A, 418B, surrounding the rotor 857, affixed to a support structure 78; wherein the impulse units 133 magnetic field conduit gap 500 straddles the fixed permanent magnets 418A,418B. In this alternate reversed arrangement, the impulse unit coil 100 is turned on and off with the proper timing from the switch 117, 316 318, 314 357, or 992 and wired as previously described in FIG. 20 in the preferred arrangement and FIG. 21 in the alternative; wherein the impulse unit 133 is repulsed and attracted to the fixed permanent magnets 418A,418B during both the impulse unit coil 100 energized phase and the impulse unit coil 100 none energized phase, causing it to spin with the rotor 857.

The invention claimed is:
1. An electric motor comprising;
    a rotor affixed to a shaft, said rotor has at least one permanent magnet attached,
    at least one device attached to said shaft which uses mechanical energy to function,
    at least one impulse unit comprised of;
        at least one coil of conductive wire with a permeable material core and,
        at least one permanent magnet;
    a magnetic field conduit made up of at least one piece of permeable material attached to the outside of the said coil and permanent magnet;
    an electric current switching device which sends current to at least one impulse unit coil in one phase when at least one rotor permanent magnet is aligned in the impulse unit magnetic field conduit gap; and
    in the second phase, when the next rotor permanent magnet is aligned in the impulse unit magnetic field conduit gap the switching device sends no current to the coil.
2. An arrangement as stated in claim 1—wherein said the switching device operating in the second phase sends current to at least one load.

* * * * *